(12) United States Patent
Cousineau et al.

(10) Patent No.: US 10,020,608 B2
(45) Date of Patent: Jul. 10, 2018

(54) CONNECTORS FOR DELIVERY OF POWER

(71) Applicant: GBATTERIES ENERGY INC., Mountain View, CA (US)

(72) Inventors: Tiziano Cousineau, Ottawa (CA); Mikhail Prokoptsov, Ottawa (CA); Mykola Sherstyuk, Ottawa (CA); Jonathon Lee, Ottawa (CA); Tymofiy Sherstyuk, Ottawa (CA)

(73) Assignee: Gbatteries Energy Canada Inc., Ottawa (CA)

( * ) Notice: Subject to any disclaimer, the term of this patent is extended or adjusted under 35 U.S.C. 154(b) by 0 days.

(21) Appl. No.: 14/878,630

(22) Filed: Oct. 8, 2015

(65) Prior Publication Data

US 2016/0104966 A1 Apr. 14, 2016

Related U.S. Application Data

(63) Continuation-in-part of application No. 29/531,128, filed on Jun. 23, 2015.

(60) Provisional application No. 62/061,881, filed on Oct. 9, 2014, provisional application No. 62/187,053, filed on Jun. 30, 2015.

(51) Int. Cl.
*H01R 13/502* (2006.01)
*G06F 1/16* (2006.01)

(52) U.S. Cl.
CPC ......... *H01R 13/502* (2013.01); *G06F 1/1616* (2013.01); *G06F 1/1635* (2013.01); *G06F 1/1656* (2013.01)

(58) Field of Classification Search
CPC ............ H01R 2201/04; H01R 2201/06; H01R 13/502
USPC ......... 439/38, 449, 450, 451, 452, 453, 464, 439/468, 470, 471, 472, 691, 700, 660, 439/676, 677, 680
See application file for complete search history.

(56) References Cited

U.S. PATENT DOCUMENTS

| | | | | |
|---|---|---|---|---|
| 2,317,590 A | * | 4/1943 | Compere | A63F 3/00075 434/150 |
| 5,183,404 A | * | 2/1993 | Aldous | G06F 1/1613 361/679.4 |
| 5,190,466 A | * | 3/1993 | McVey | H01R 13/60 439/133 |

(Continued)

*Primary Examiner* — Harshad C Patel
(74) *Attorney, Agent, or Firm* — Schott, P.C.

(57) ABSTRACT

A connector includes a connector insert comprising a first plurality of electrical contacts configured to electrically couple, in a mated position, with a second plurality of electrical contacts within a connector receptacle housing accessible via a first surface of a computing device; and a non-magnetic connector insert housing configured to mechanically couple, in the mated position, with a second surface of the computing device. A computing system includes a connector insert comprising a first plurality of electrical contacts; a computing device comprising a connector receptacle housing accessible via a first surface of the computing device, the connector receptacle housing comprising magnetic elements and a second plurality of electrical contacts configured to electrically couple, in a mated position, with the first plurality of electrical contacts in the connector insert; and a non-magnetic connector insert housing configured to mechanically couple, in the mated position, with a second surface.

12 Claims, 55 Drawing Sheets

(56) References Cited

U.S. PATENT DOCUMENTS

| | | | |
|---|---|---|---|
| 5,411,405 A * | 5/1995 | McDaniels | H01R 13/447 361/679.4 |
| 5,547,401 A * | 8/1996 | Aldous | B65G 1/133 439/676 |
| 5,931,704 A * | 8/1999 | Johnson | H01R 31/005 439/676 |
| 5,989,042 A * | 11/1999 | Johnson | H01R 13/639 439/131 |
| 6,033,240 A * | 3/2000 | Goff | H01R 31/005 439/131 |
| 6,146,210 A * | 11/2000 | Cha | H01R 13/2421 439/289 |
| 6,361,357 B1 * | 3/2002 | Stillwell | H01R 13/6691 362/23.01 |
| 6,364,697 B1 * | 4/2002 | Tseng | G06F 1/1632 439/533 |
| 6,482,019 B1 * | 11/2002 | Lo Forte | H01R 13/453 439/131 |
| 6,509,876 B1 * | 1/2003 | Jones | H01Q 1/22 343/700 MS |
| 6,561,824 B1 * | 5/2003 | Beckham | G06F 1/1613 439/131 |
| 6,729,897 B2 * | 5/2004 | Lai | H01R 13/6397 439/133 |
| 6,799,981 B1 * | 10/2004 | Yu | H01R 13/6397 439/133 |
| 7,189,089 B1 * | 3/2007 | Liao | H01R 27/00 439/170 |
| 7,500,867 B1 * | 3/2009 | Doglio | H01R 13/5812 439/456 |
| 7,794,263 B1 * | 9/2010 | Kim | H01R 13/6271 439/357 |
| 7,918,686 B1 * | 4/2011 | Lin | H01R 13/743 439/557 |
| 8,137,116 B2 * | 3/2012 | Omori | H01R 4/64 439/883 |
| 8,142,221 B2 * | 3/2012 | Malstron | H01R 13/665 439/489 |
| 8,698,022 B2 * | 4/2014 | Kawakami | B25F 5/02 200/302.2 |
| 9,054,440 B2 * | 6/2015 | Taylor | H01R 13/436 |
| 2002/0028604 A1 * | 3/2002 | Lo | H01R 9/035 439/607.56 |
| 2003/0224637 A1 * | 12/2003 | Ling | H01R 13/6397 439/133 |
| 2004/0224539 A1 | 11/2004 | Boyd et al. | |
| 2007/0141918 A1 * | 6/2007 | Ohta | G06F 1/1632 439/694 |
| 2007/0273643 A1 * | 11/2007 | Erez | G06F 3/0338 345/156 |

* cited by examiner

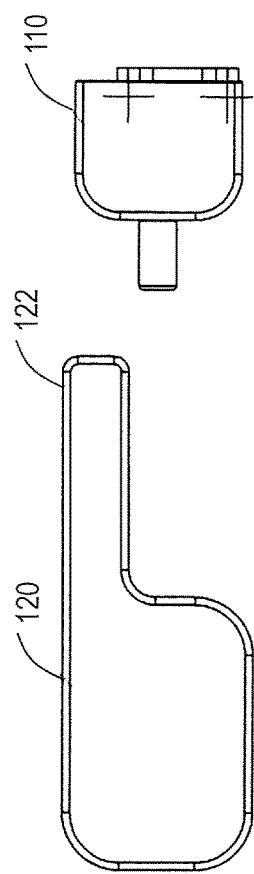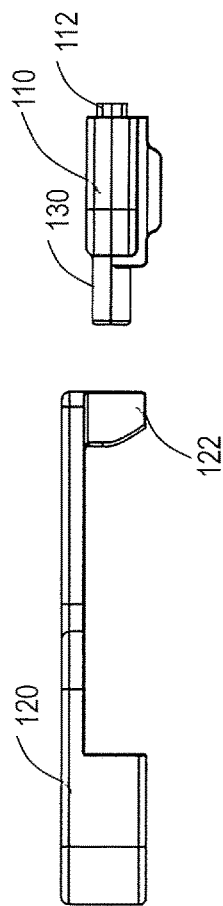
FIG. 4A  FIG. 4B  FIG. 5A  FIG. 5B

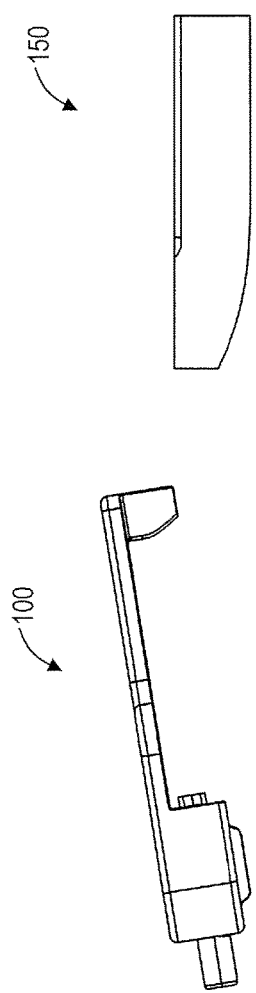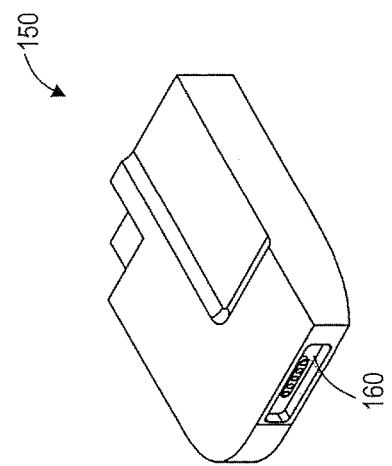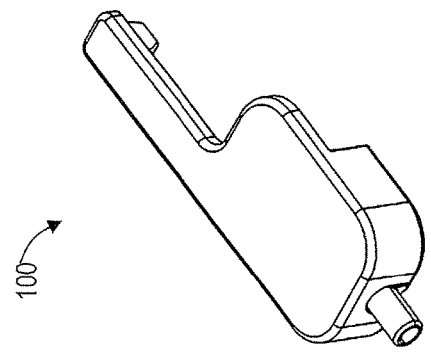
FIG. 7A
FIG. 7B

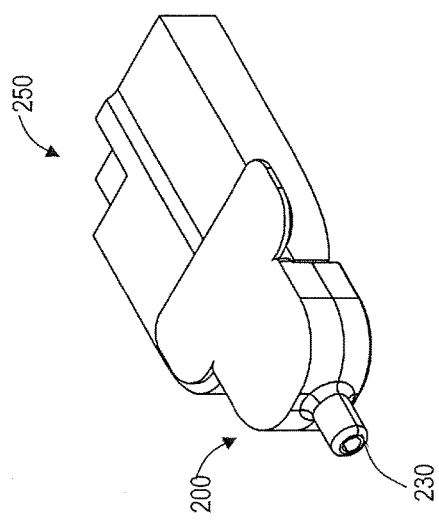
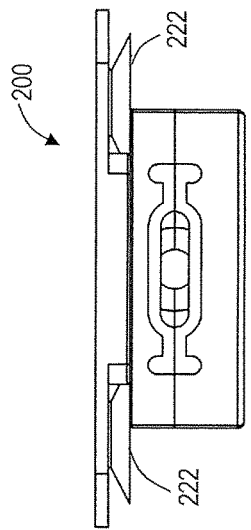
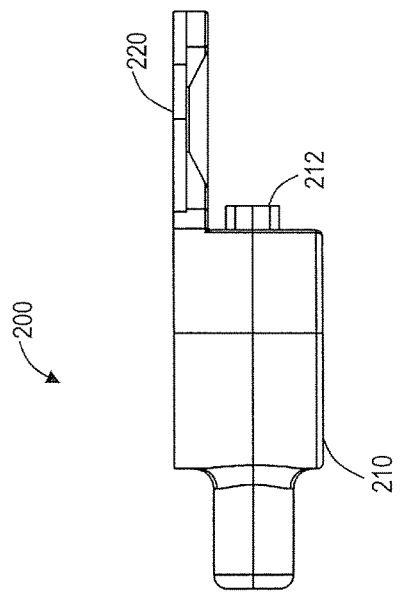
FIG. 11
FIG. 12B
FIG. 12A

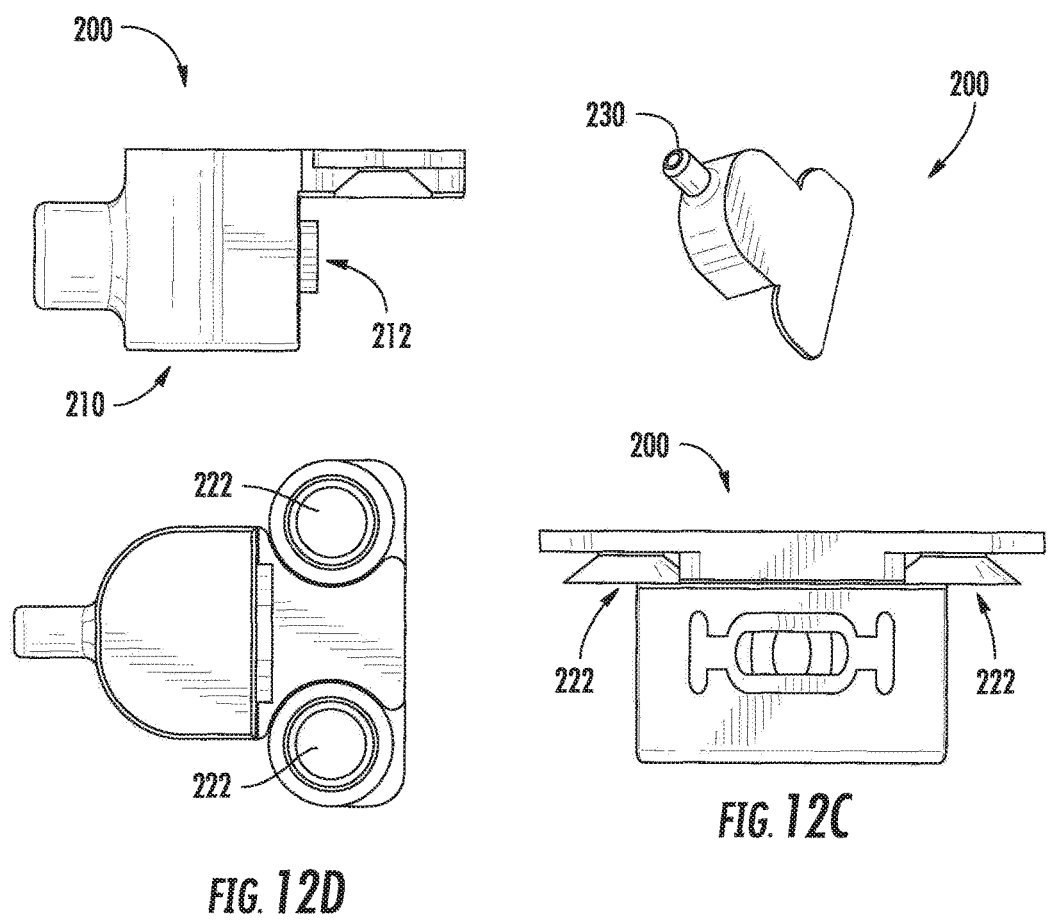

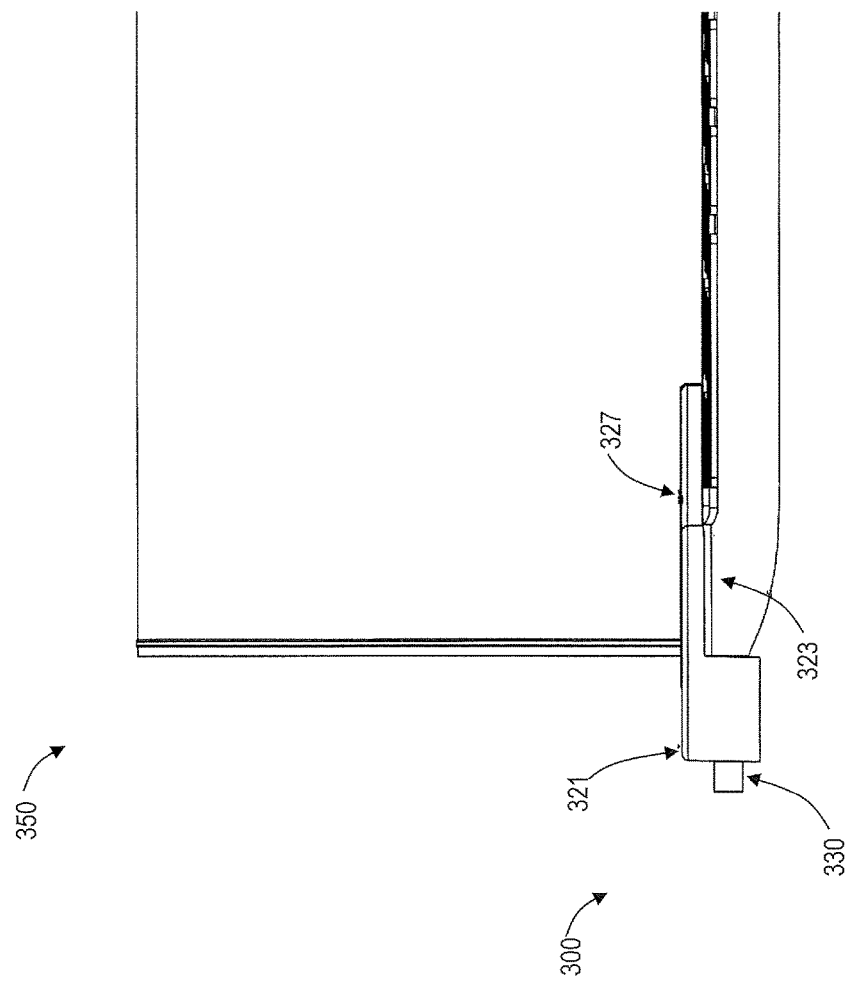

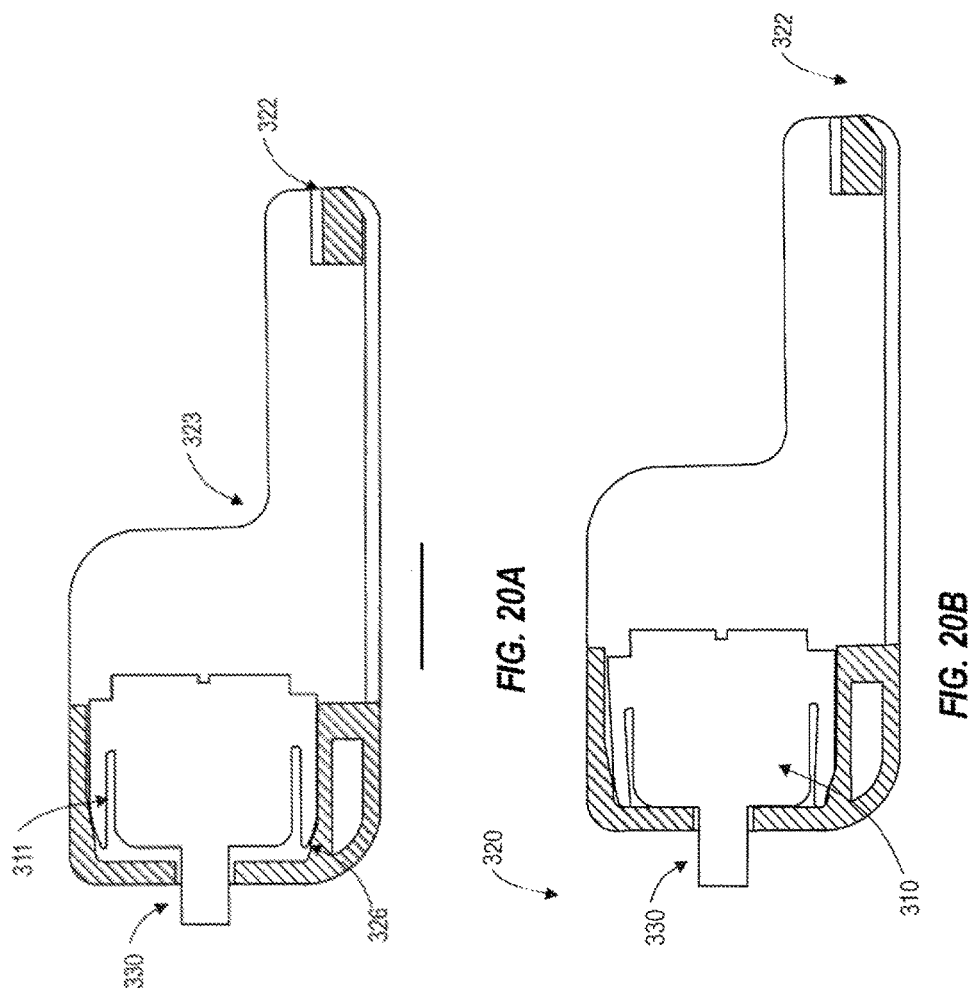

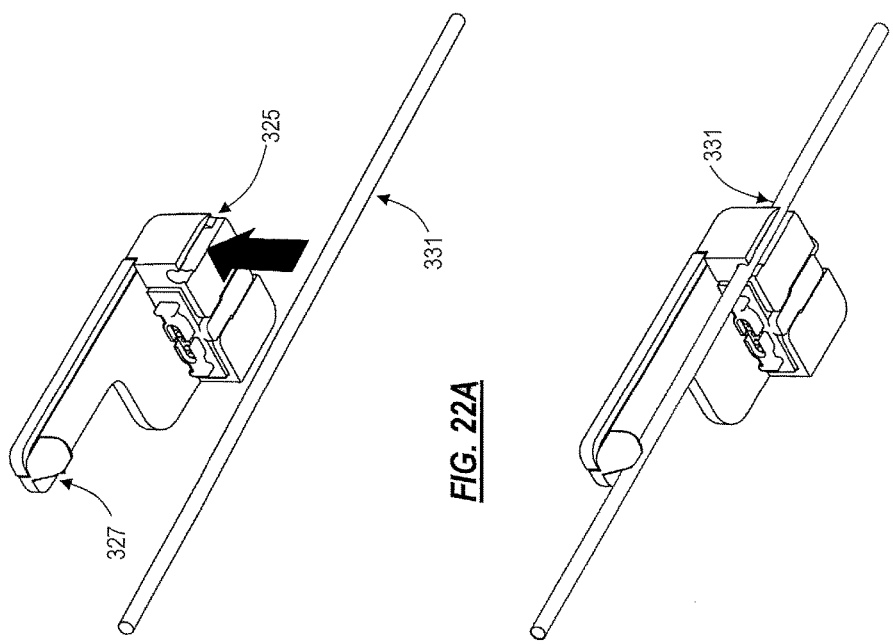

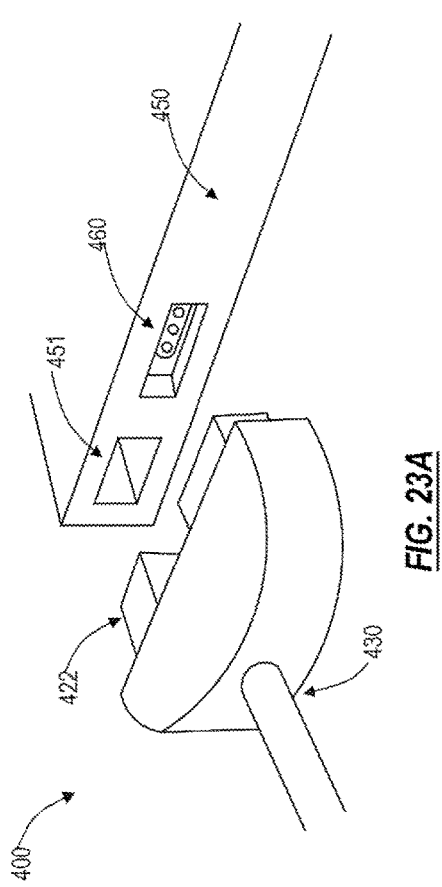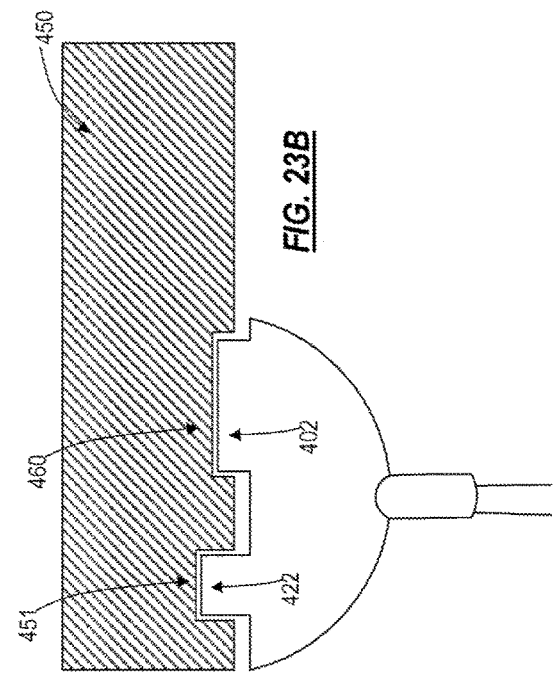

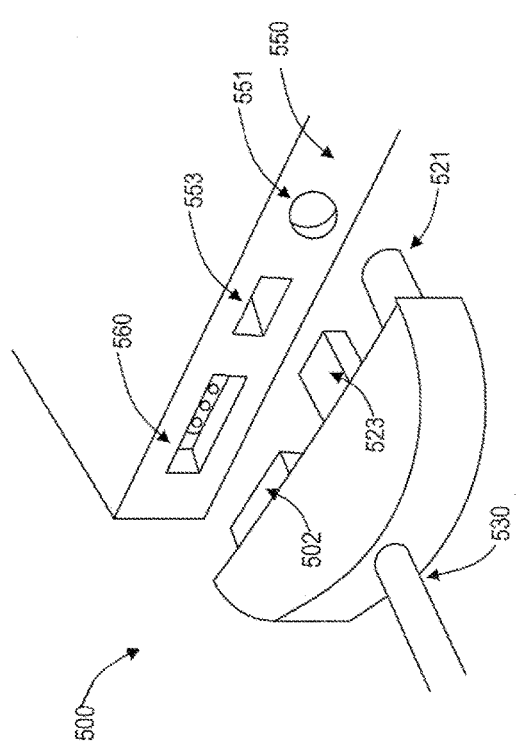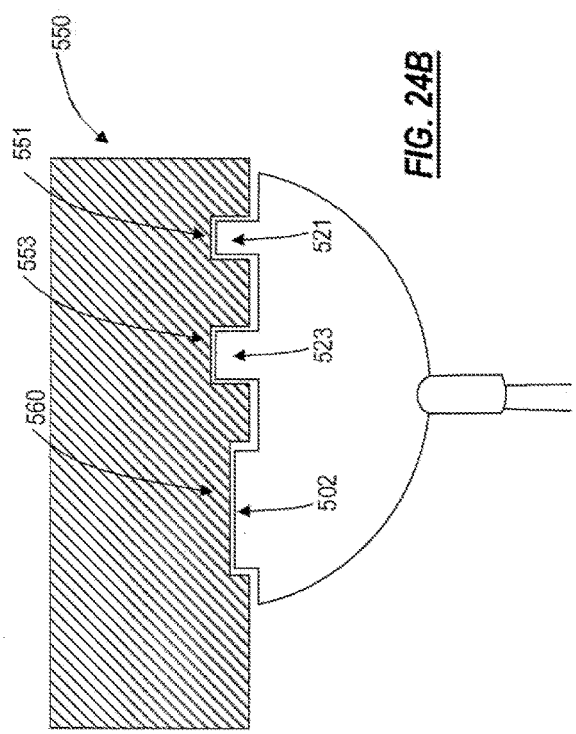

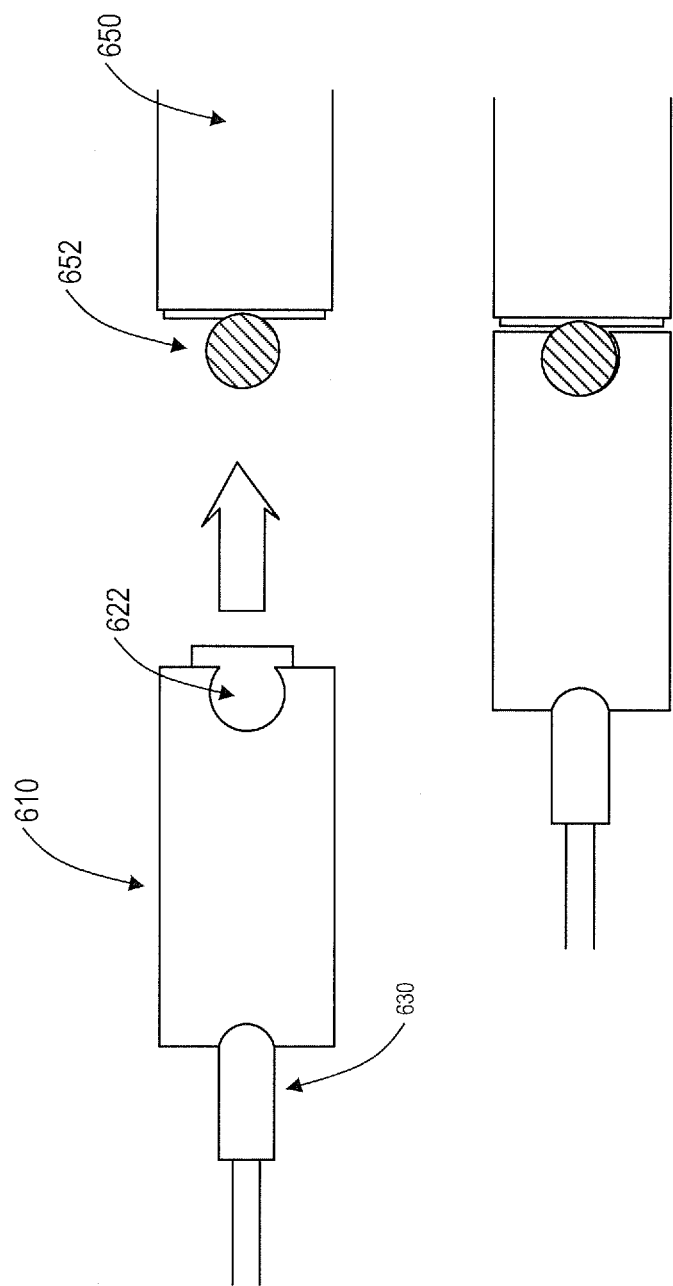

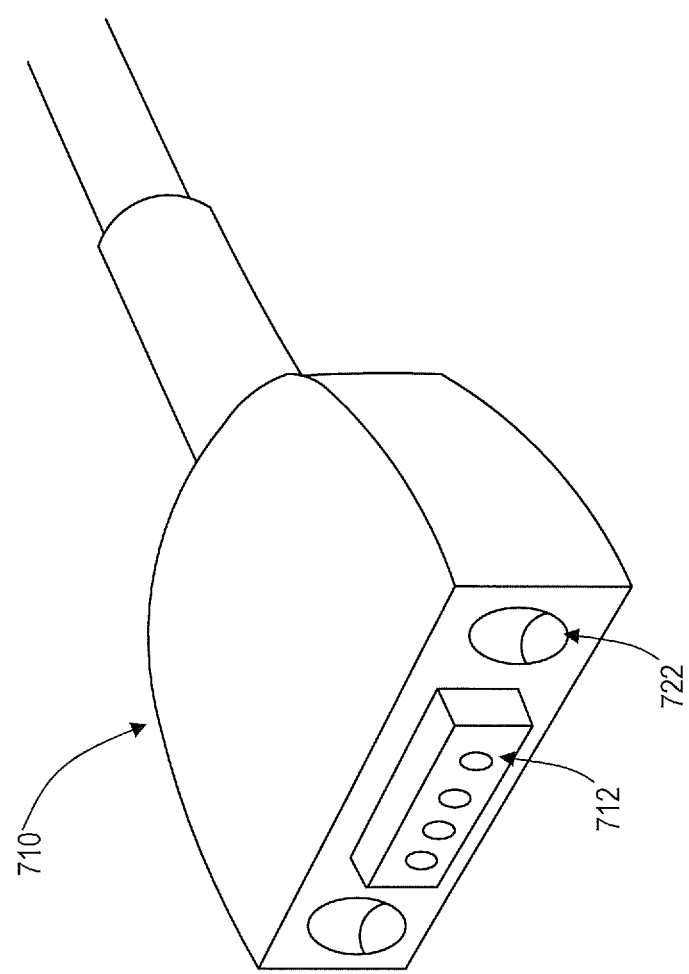

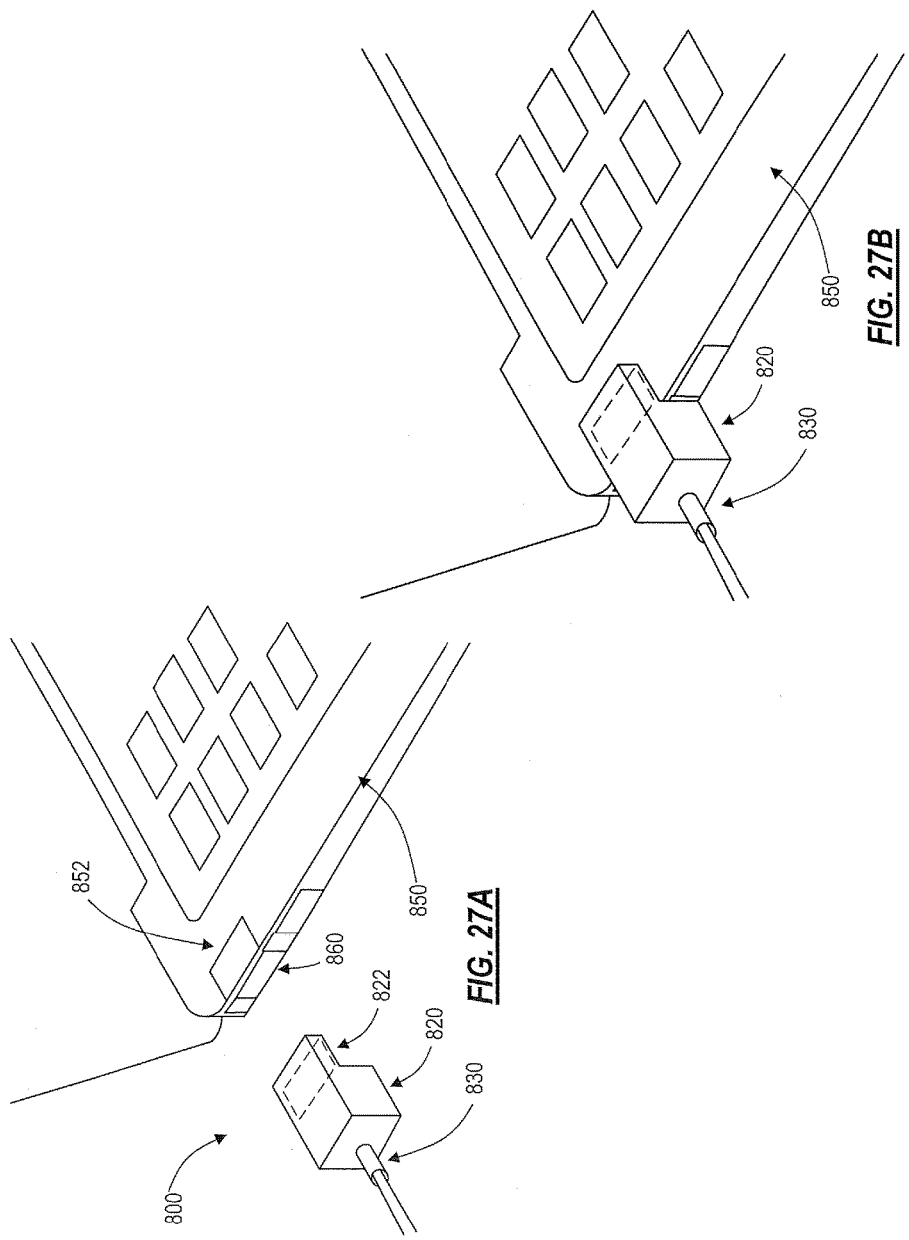

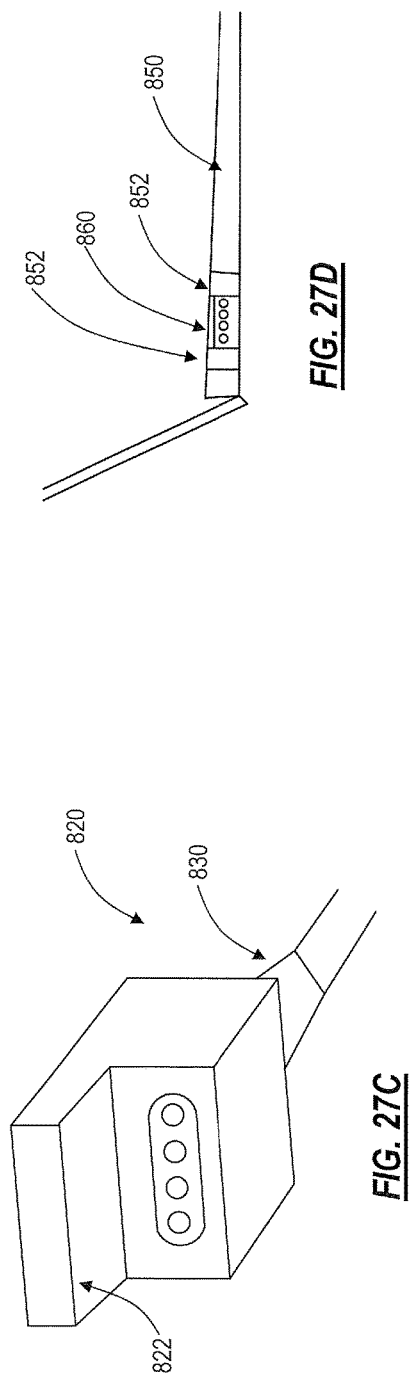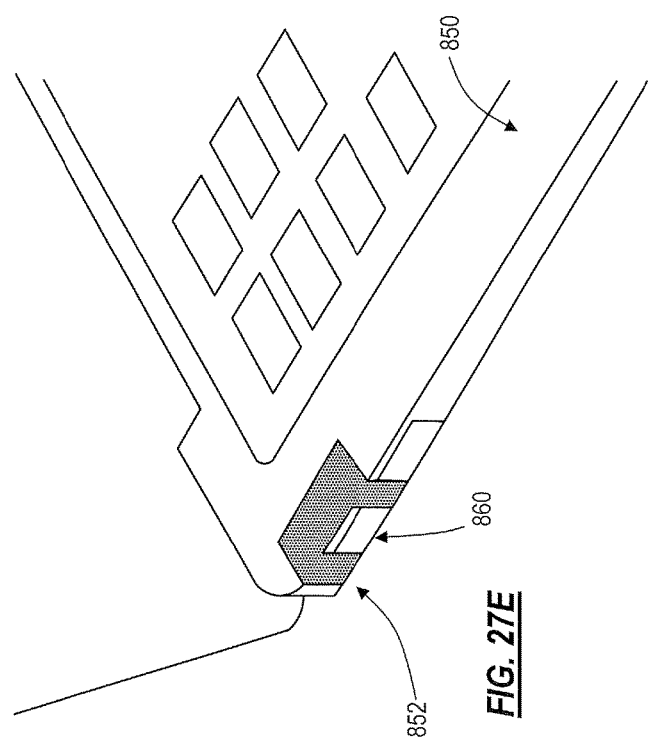

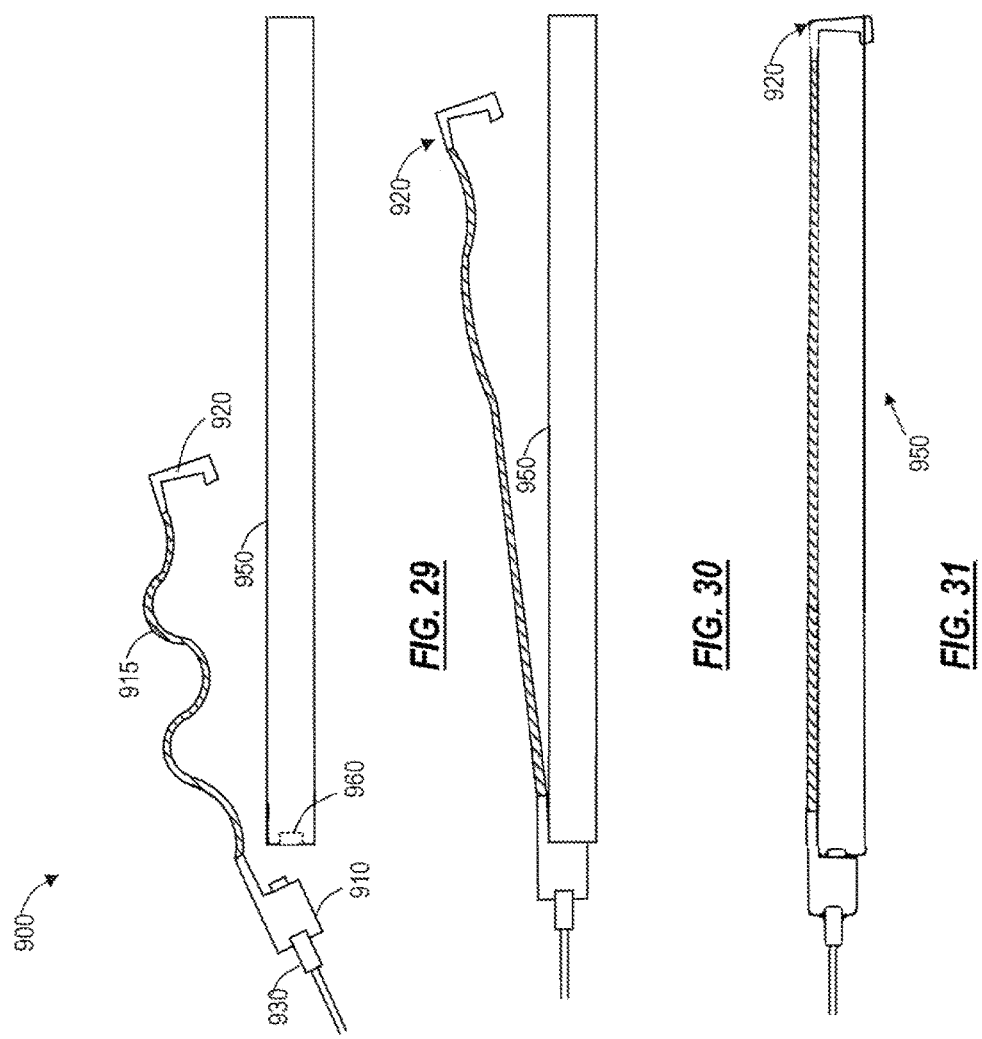

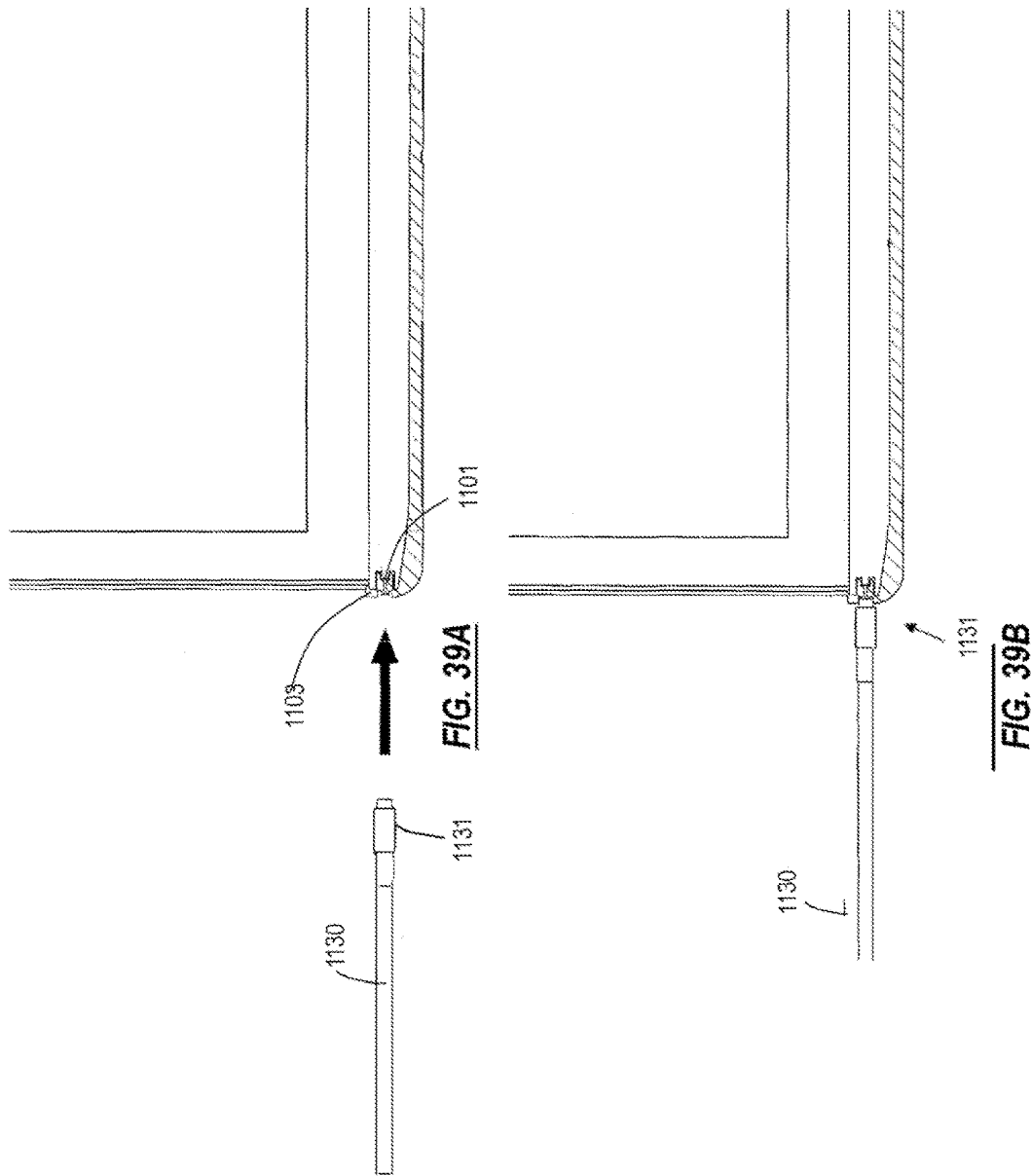

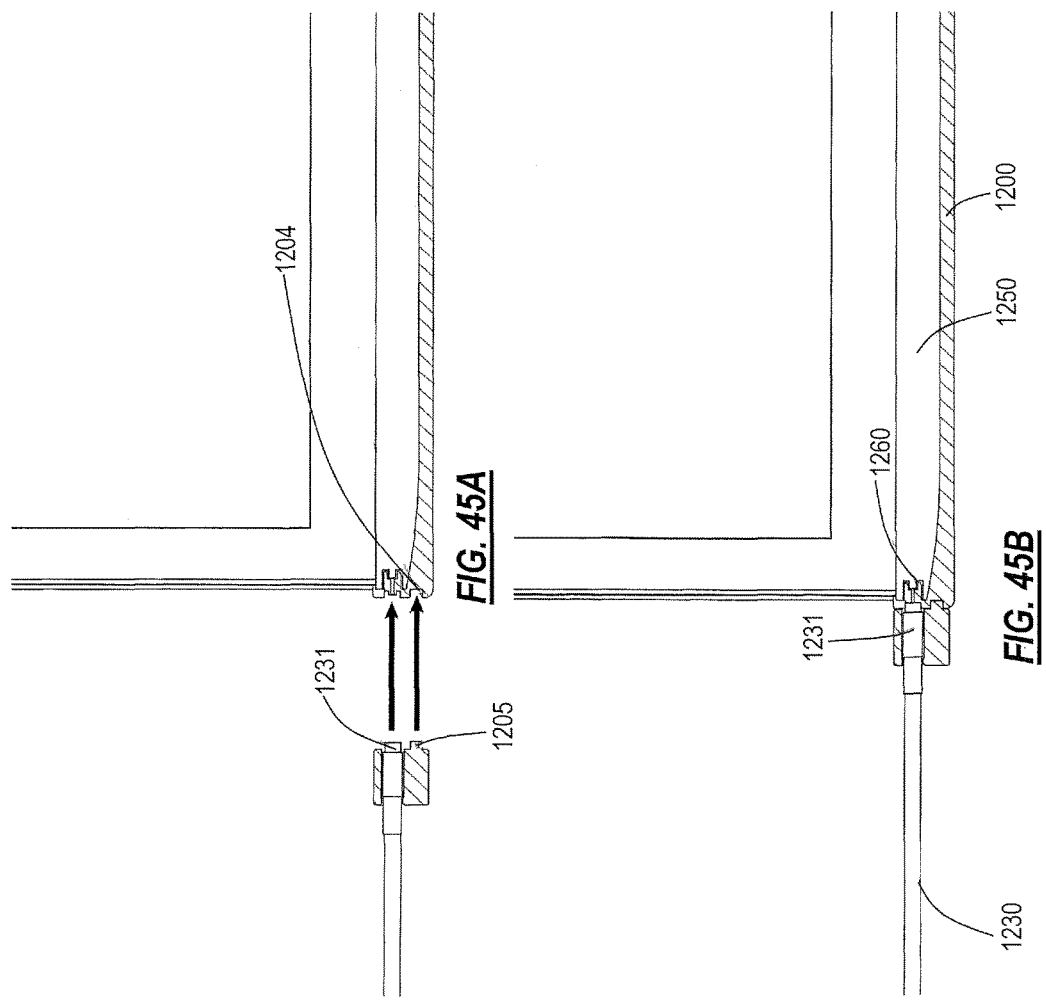

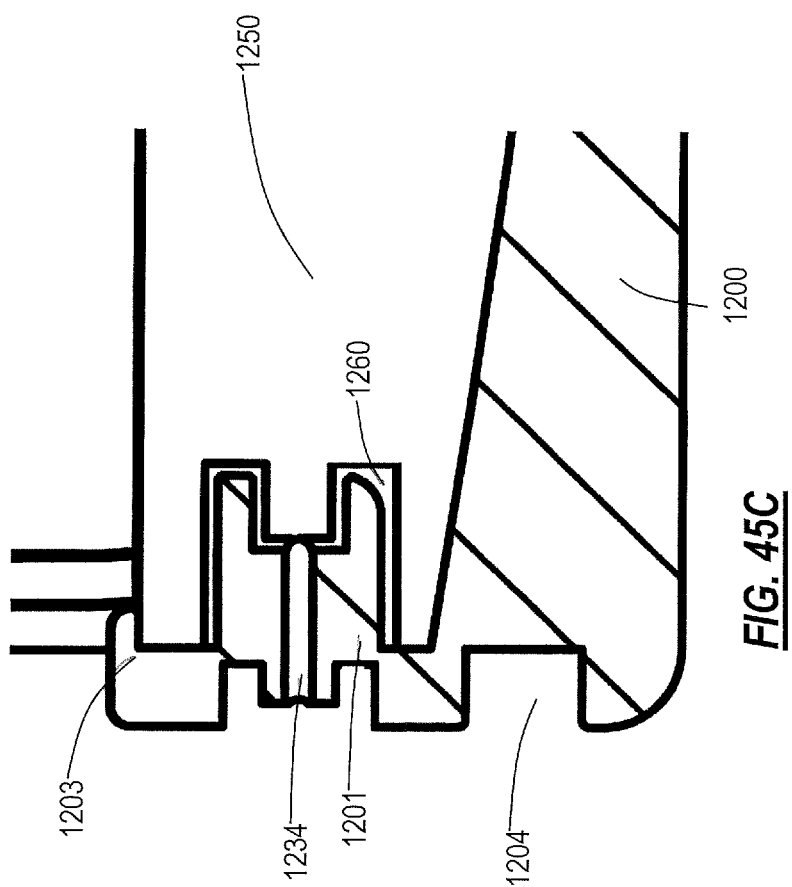

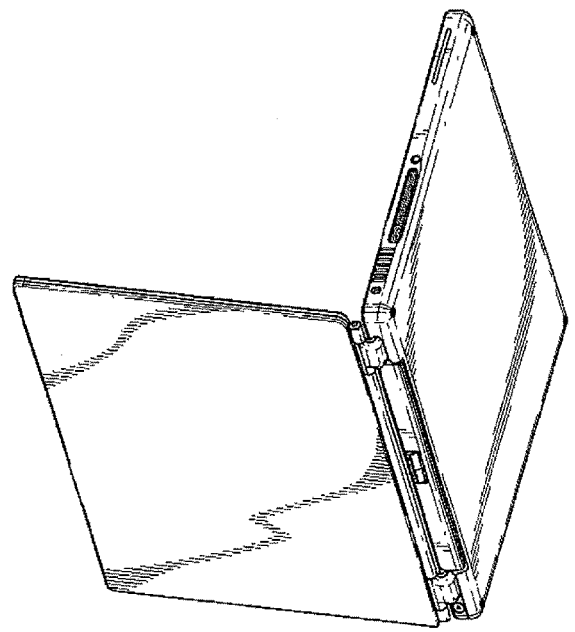
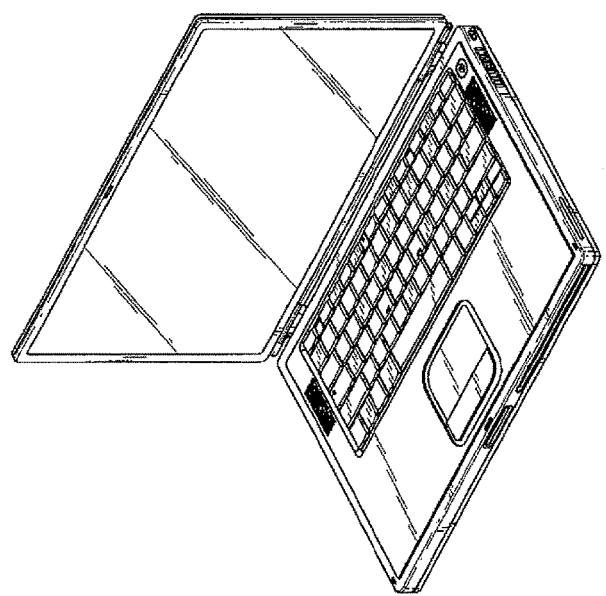
FIG. 46
Prior Art

CONNECTORS FOR DELIVERY OF POWER

CROSS-REFERENCE TO RELATED APPLICATIONS

The present patent/application claims priority to U.S. Provisional Patent Application No. 62/061,881, filed Oct. 9, 2014 and entitled "NON-MAGNETIC CONNECTORS FOR DELIVERY OF POWER", to U.S. Design patent application Ser. No. 29/531,128, filed Jun. 23, 2015 and entitled "POWER CONNECTOR AND CLIP COMBINATION", and to U.S. Provisional Patent Application No. 62/187,053, filed Jun. 30, 2015 and entitled "CONNECTORS FOR DELIVERY OF POWER", the contents of each are incorporated by reference herein.

FIELD OF THE DISCLOSURE

The present disclosure is generally directed to delivery of electrical power to computing devices equipped with connector receptacles, and in particular to connectors for delivery of electrical power.

BACKGROUND OF THE DISCLOSURE

Several connector designs are known to use magnetic attraction in mating to a magnetic connector receptacle integrated in a computing device (e.g. a laptop, a tablet or a smartphone) for delivery of electrical power. For example, magnetic connectors Magsafe and Magsafe 2 are sold by Apple for use in combination with their computing devices that have multiple magnets residing in their connector receptacle. Such a connector may contain a ferromagnetic material, which might potentially interact with any source of magnetic field to be partially magnetized and become a small magnetic field source itself. This might affect the accuracy or safety of sensitive electronics, attract conductive elements to the connector or otherwise cause some damage to the computing device. In addition, connectors that do not detach easily from the connector receptacle may cause injury to a user who may for example, trip over a cord connected to the connector receptacle. As such, there exists a need to improve safety and to provide mating solutions for electrical connection between a connector and a connector receptacle that are either non-magnetic or mitigate the disadvantages of magnetic element-based solutions.

FIG. 46 shows a laptop, an exemplary computing device. It comprises a display screen attached to a main body portion, which typically contains the hardware necessary for processing and storage. In typical embodiments, the screen display portion hinges to the main body portion and may be opened by a user during operation to reveal the screen or may be closed by a user (for example, during storage). The main body portion typically contains a keyboard and a track pad to allow user input to the computing device.

The keyboard and track pad are accessible via an upper surface of the main body portion, while the lower surface of the main body portion rests on the surface that the laptop is placed on (e.g. a table or a user's lap). Perpendicular surfaces wrap around the main body portion, and connect to the upper and lower surfaces of the main body portion. Connector receptacles for connecting other electronic devices (e.g. peripheral devices such as printers etc.), power sources, or loads to the laptop may be accessible via any of the surfaces of the laptop including the perpendicular surfaces that wrap around the main body portion. Each connector receptacle is formed by a connector receptacle housing which may, in embodiments, be used to attach the connector receptacle to the rest of the computing device. In other embodiments, the electrical pins of the connector receptacle may be attached directly to the main printed circuit board (PCB) of the computing device.

For ease of reference hereinafter, the surfaces of the laptop can be denoted as follows:
First Surface—Side wall of main body portion on the left looking from TOP perspective
Second Surface—Side wall of main body portion on the right looking from TOP perspective
Third Surface—Side wall of main body portion on the front looking from TOP perspective
Fourth Surface—Side wall of main body portion on the rear looking from TOP perspective
Fifth Surface—Upper surface of main body portion
Sixth Surface—Lower surface of main body portion
Seventh Surface—Front surface of display screen portion
Eighth Surface—Rear surface of display screen portion

BRIEF DESCRIPTION OF THE DRAWINGS

Embodiments of the present disclosure will now be described, by way of example only, with reference to the attached figures.

FIG. 4A-4B show top views of the separate parts of the connector of FIG. 1, according to embodiments where it is designed as separate parts.

FIG. 5A-5B show side views of the separate parts of the connector of FIG. 4.

FIG. 7A-10B show side and perspective views of four sequential stages of the connector of FIG. 1 being mated with the connector receptacle of a computing device.

FIG. 11 shows a perspective view of a connector, according to a second embodiment of the present disclosure, mated with the connector receptacle of a computing device.

FIG. 12A-12D show side, front, perspective and bottom-up views of the connector of FIG. 11.

FIG. 17 is a side view (from direction B-B in FIG. 15) of the connector and the computing device of FIG. 15.

FIG. 20A and FIG. 20B show cross section views of the connector insert housing's cavity with the connector insert housed therein.

FIG. 22A-22B are perspective views of the combination of the connector insert housing and the connector insert, shown separate and attached to a cable.

FIG. 23A-23B are perspective and top views of a connector, according to a fourth embodiment of the present disclosure, mating and mated, to a receptacle of a computing device.

FIG. 24A-24B are perspective and top views of a connector, according to a fifth embodiment of the present disclosure, mated with the connector receptacle of a computing device.

FIG. 25A-25C show perspective (back and front) and side views of a connector, according to a sixth embodiment of the present disclosure, mating and mated, with the connector receptacle of a computing device.

FIG. 26A-26B show perspective views of a connector, according to a seventh embodiment of the present disclosure, mating with the connector receptacle of a computing device.

FIG. 27A-27C show perspective (back and front) and side views of a connector, according to an eighth embodiment of the present disclosure, mating and mated with the connector receptacle of a computing device (whose side and perspective views are shown in FIG. 27D-27E).

FIG. 29-31 show side views of three sequential stages of the connector of FIG. 28A-28B being mated with the connector receptacle of the computing device.

FIG. 39A-39B show side views of two sequential stages of a ferromagnetic connector insert mating to the receptacle cavity, through the non-magnetic interposer of the case of FIG. 37A-37B.

FIG. 45A-45D show side and front cross-sectional views of the connector insert of FIG. 43 connecting to the case by use of the interposer and the snap connector.

FIG. 46 shows left and right perspective views of an exemplary computing device with which the connectors of the present disclosure can be used.

DETAILED DESCRIPTION

Figure 1:
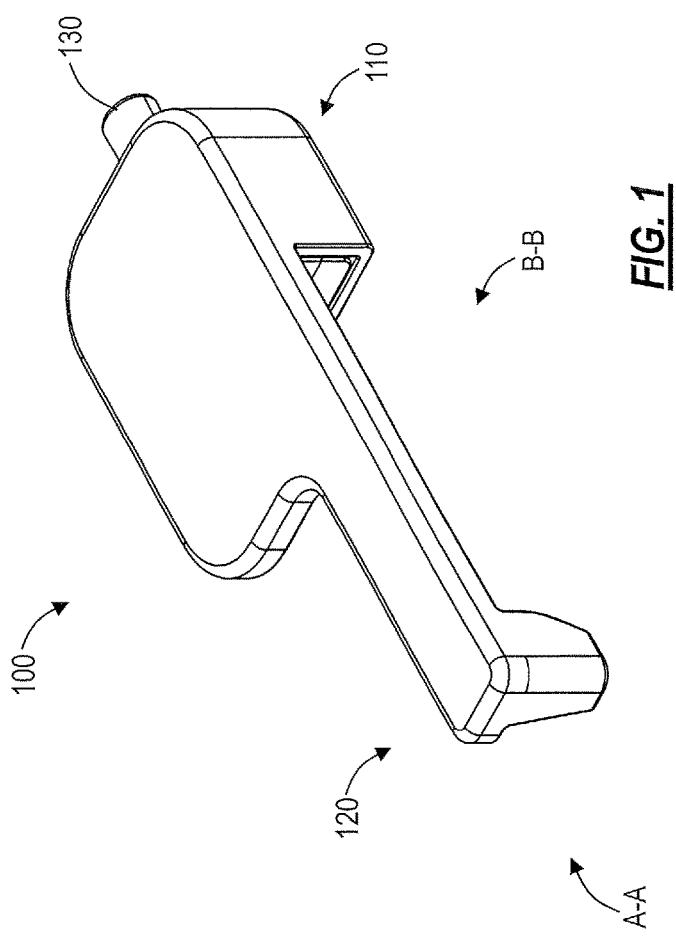
FIG. 1 is a front perspective view of connector, according to a first embodiment of the present disclosure.

FIG. 1 shows a front perspective view of a connector 100, according to a first embodiment of the present disclosure. The connector 100 comprises a connector insert 110, a connector insert housing 120 and a cable end 130. The cable end 130 allows an electrical cable (not shown) to be connected to a plurality of first electrical contacts of the connector insert 110. The electrical cable may, at the other end (not shown), be either connected to a conventional AC power supply (exemplarily, a wall socket) via an adapter, or could be connected to a portable power source (e.g. a battery pack). The connector insert 110 is designed to substantially non-magnetically mate with a connector receptacle of a computing device, which may or may not be a magnetic connector receptacle (i.e., it has magnets embedded therewithin). In the mated position, the first electrical contacts of the connector insert electrically couple with the second electrical contacts of the computing device's connector receptacle, to allow for transfer of electrical power thereto.

Figure 2:
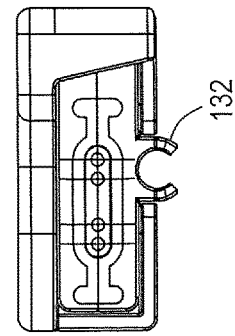
FIG. 2 is a front view (from direction A-A in FIG. 1) of the connector of FIG. 1.

FIG. 2 is a front view (from direction A-A in FIG. 1) of the connector 100 of FIG. 1. The first electrical contacts may be arranged in a straight line, in embodiments, and may be plated and spring loaded pins to maintain contact with a corresponding plurality of second electrical contacts of the connector receptacle. The pins are biased to push the pins towards the connector receptacle. The connector also comprises an optional cable holder receptacle (e.g. a clip as shown in FIG. 2) 132 designed to hold a cable (e.g. the electrical cable attached to the cable end 130), to avoid clutter caused by excessive length of the cable. The cable holder receptacle 132 may be useful to avoid clutter, both during storage of the connector 100 or during use of the same.

Figure 3:
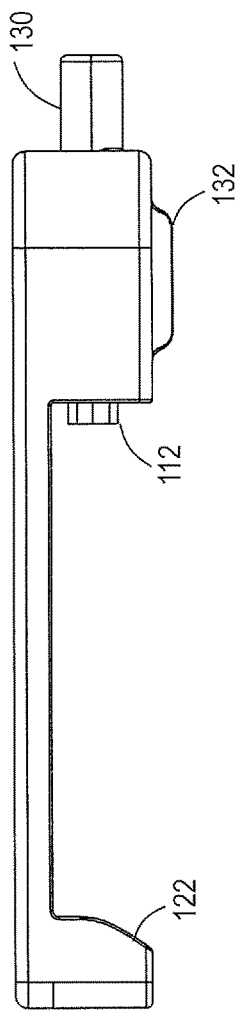
FIG. 3 is a side view (from direction B-B in FIG. 1) of the connector of FIG. 1.

FIG. 3 is a side view (from direction B-B in FIG. 1) of the connector 100 of FIG. 1. The dimensions (e.g. length) of the connector insert housing 120 may be different depending on the dimensions of the computing device to which the connector 100 is to attach. In embodiments, the connector insert housing 120 comprises an end portion 122, which is configured to rest in the space between display screen and the keyboard of a laptop, for example, between the bottom of the display screen and the top of the surface of the laptop containing the keyboard, when the connector insert 100 is in a mated position with the connector receptacle of the computing device. The connector insert 110 comprises a face portion 112, and the first electrical contacts are configured to be located within this face portion 112. The dimensions and shape of the face portion 112 are designed to allow for tight mating of the connector insert 110 with the connector receptacle of the computing device.

In embodiments, the connector 100, except for the plurality of first electrical contacts, is made of a non-conducting and non-magnetic material (e.g. plastic), such that its mating with the connector receptacle is non-magnetic even if the connector receptacle comprises magnets and/or magnetic elements.

In embodiments, the connector insert housing 120 and the connector insert 110 may be (though not necessarily) designed as separate parts. This allows a user to attach connector insert housings of different dimensions to the same connector insert, depending on the computing device of choice. The cable end 130 may be configured to connect to the connector insert 110 directly or via the connector insert housing 120. FIG. 4A-4B and FIG. 5A-5B show top and side views of the separate connector insert housing 120 and the connector insert 110 respectively, when the connector 100 is designed to have separate parts.

Figure 6A:
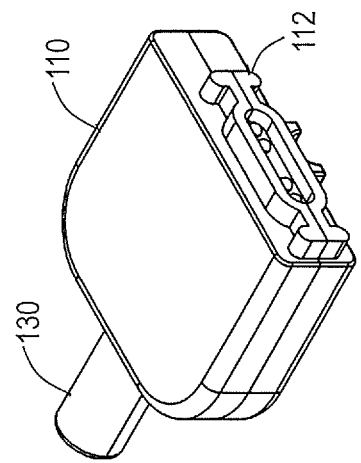
FIG. 6A-6C show the perspective, side and front views of the connector insert of the connector of FIG. 4A-4B.
Figure 6C:
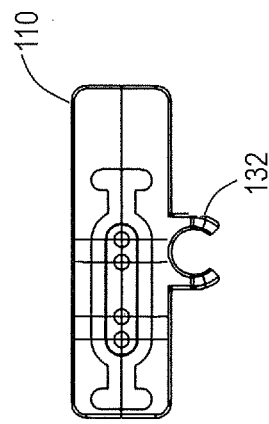
Figure 6B:
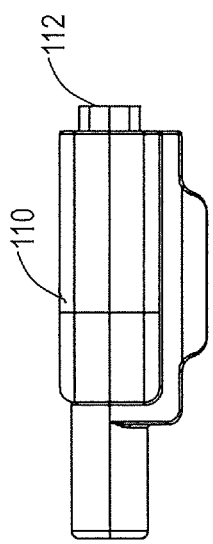
Figure 8A:
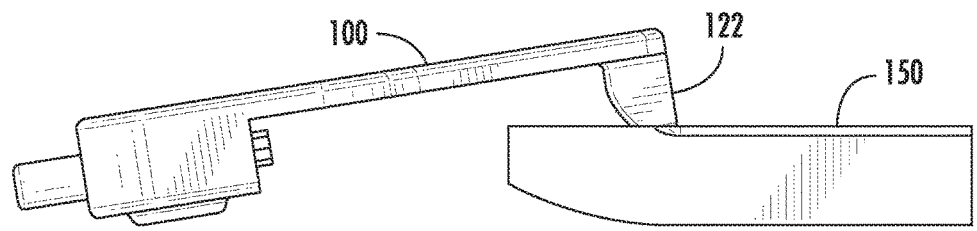
Figure 8B:
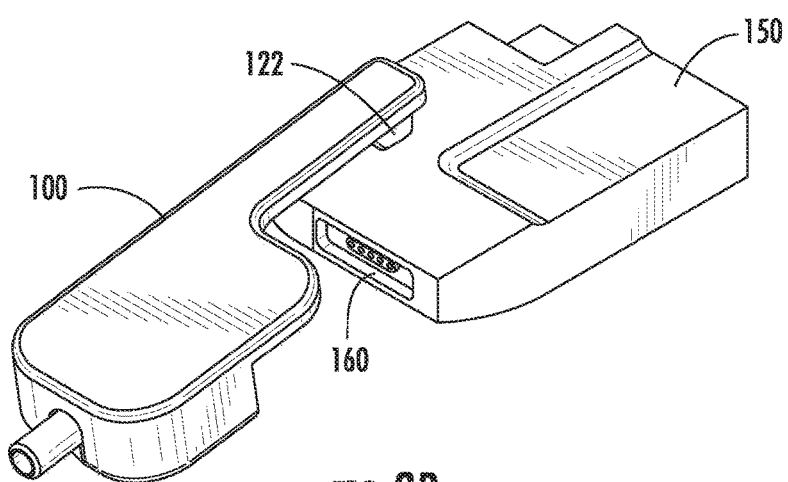
Figure 9A:
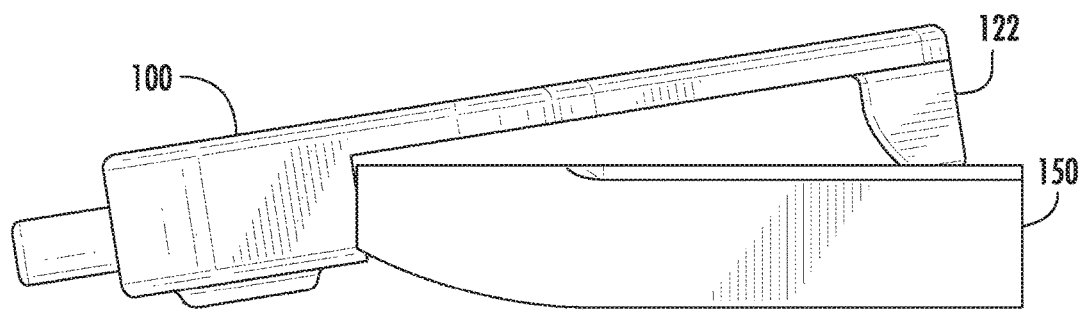
Figure 9B:
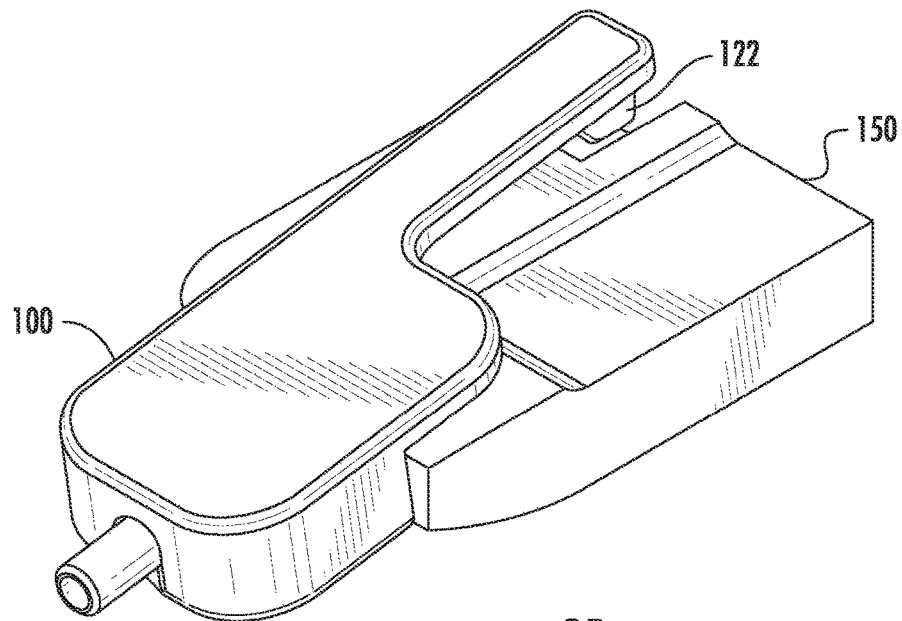
Figure 10A:
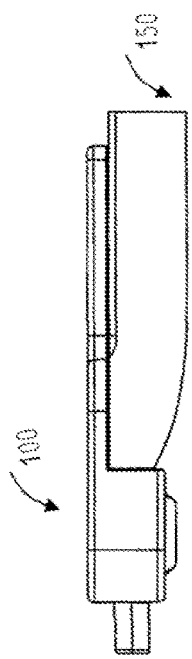
Figure 10B:
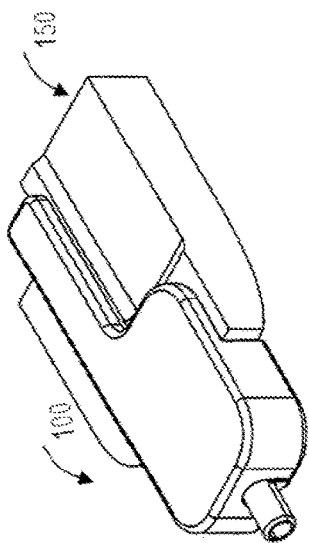

FIG. 6A-6C show the perspective, side and front views of the connector insert 110 of the connector 100 of FIG. 4A-4B. As noted above, the dimensions and shape of the face portion 112 are designed to allow for tight mating of the connector insert 110 with the connector receptacle of the computing device.

FIG. 7A-10B show side and perspective views of four sequential stages of the connector 100 being mated with a connector receptacle 160 of a computing device 150 (exemplarily, a laptop (shown only partially) in these figures). In FIGS. 7A-7B, the connector 100 is shown, from side and perspective views, to be positioned in a way for it to mate with the connector receptacle 160 of the computing device 150. FIG. 8A-9B show the end portion 122 touching the surface of the laptop 150 and being guided to its final position (shown in FIG. 10A-10B), i.e., in the space between the display screen and the keyboard of the laptop 150. On account of this final position and design of the end portion 122, the connector 100 is mechanically ensured to be in a strong mating relation with the connector receptacle 160, thereby improving the electrical connection between the first and second pluralities of electrical contacts. As noted earlier, in embodiments, most parts of the connector insert 110 are made out of non-magnetic material that are not capable of creating magnetic interference with any sensitive electronics or of interacting with any magnets that may be contained in the connector receptacle 160 of the computing device 150.

FIG. 11 shows a perspective view of a connector 200, according to a second embodiment of the present disclosure, mated with a connector receptacle 260 of a computing device 250. FIGS. 12A-12D show side, front, perspective and bottom-up views of the connector 200 of FIG. 11. The connector 200, as shown in FIGS. 12A-12D, comprises a cable end 230, a connector insert 210 with a face portion 212, and a connector insert housing 220 comprising one or more suction cups 222 that are designed to make contact with a surface of the computing device 250 when the connector insert 210 is in a mated position with the connector receptacle 260 of the computing device 250.

Figure 13A:
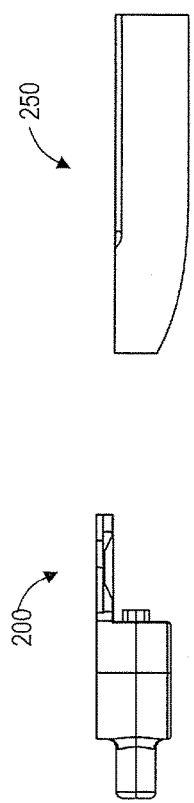
FIG. 13A, 13B, 14A, 14B, and 14C show side and perspective views of two sequential stages of the connector of FIG. 11 being mated with the connector receptacle of a computing device.
Figure 13B:
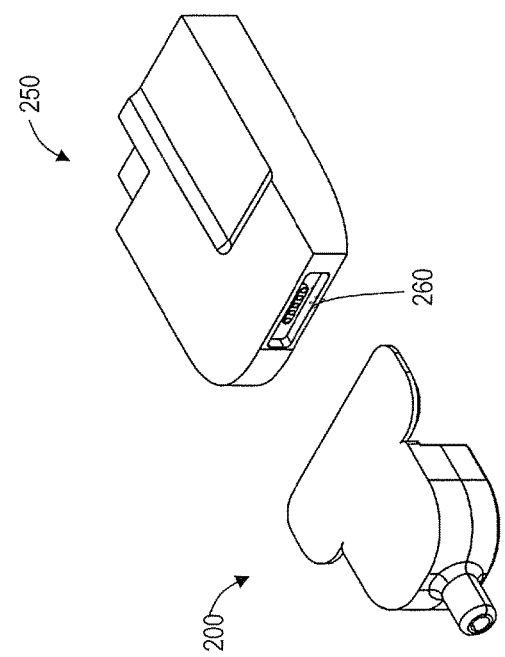
Figure 14A:
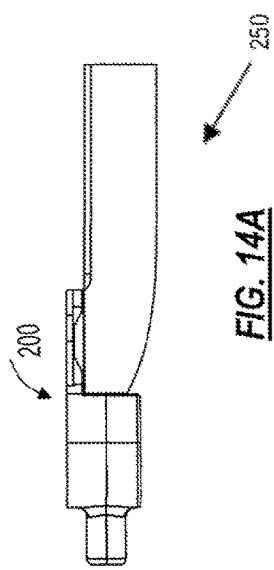
Figure 14B:
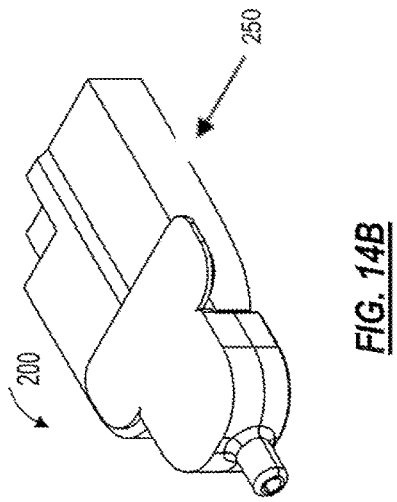
Figure 14C:
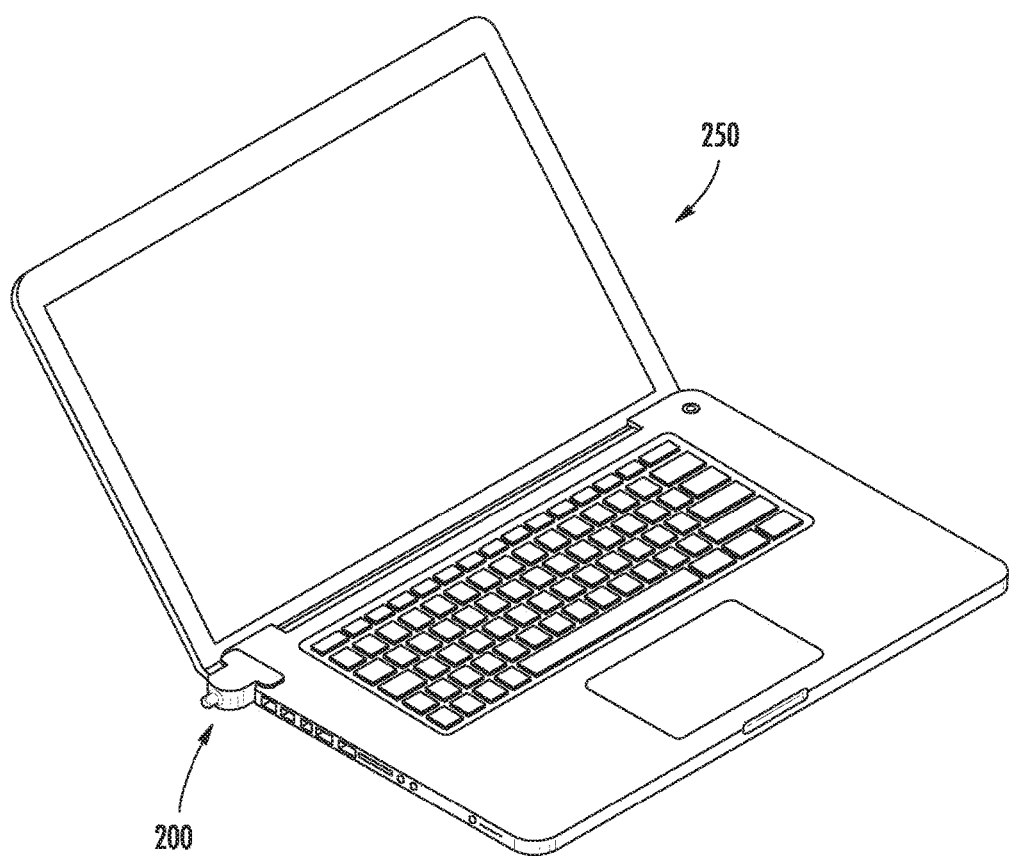

FIGS. 13A-14C show side and perspective views of two sequential stages of the connector 200 of FIG. 11-12D being mated with the connector receptacle 260 of a computing device 250. In FIGS. 13A and 13B, the connector 200 can be seen, from side and perspective views, positioned in a way for it to mate with the connector receptacle 260 of the computing device 250. In FIGS. 14A and 14B, the connector 200 can be seen, from side and perspective views, mated with the connector receptacle 206 of the computing device 200 according to the second embodiment of the present disclosure. The computing device 250 having the connector 200 mated to the connector receptacle 260 can be seen in FIG. 14C.

In embodiments, connector 200 contains minimal ferromagnetic material and therefore does not interfere with any magnets contained in the connector receptacle (whether magnetic or not) or with any surrounding electronics (both inside the computing device and outside the computing device 250).

Figure 15:
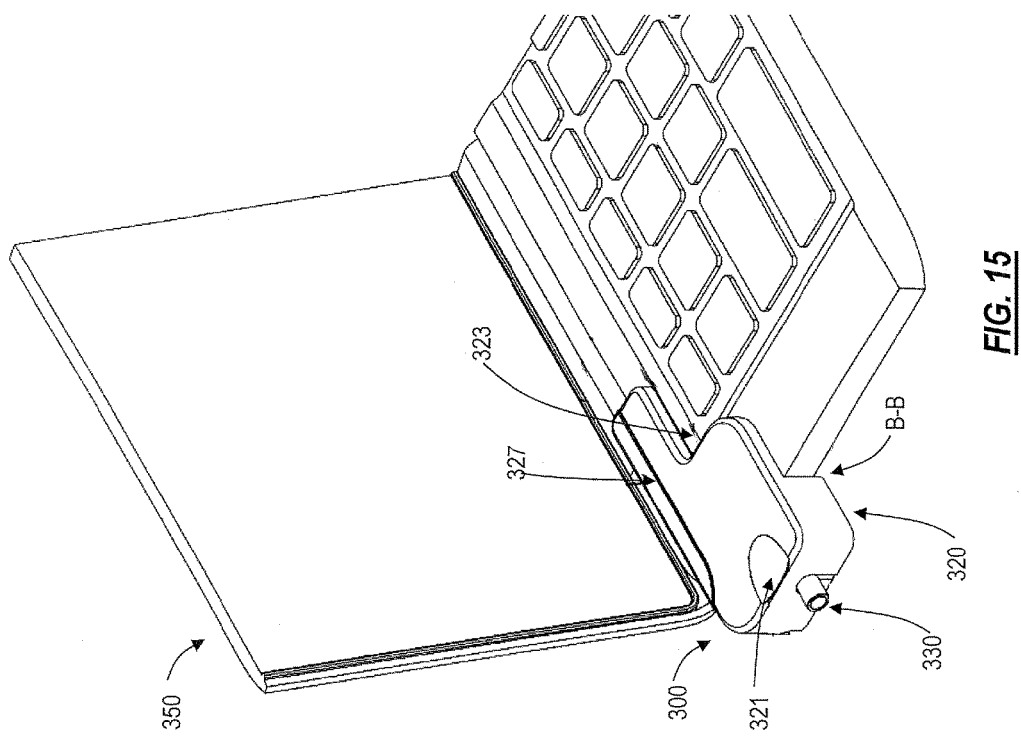
FIG. 15 is a front perspective view of the connector, according to a third embodiment of the present disclosure, mated to a computing device.

FIG. 15 shows a perspective view of a connector 300, according to a third embodiment of the present disclosure, mated to a target computing device 350 (i.e., a laptop). An exemplary implementation of this embodiment may be found at getbatterybox.com/snapfit-connector. The connector insert housing 320 comprises a protective edge strip 327, a finger indent affordance 321 and a visual alignment guide 323. The protective edge strip 327 minimizes the hardness of the connector edge and in embodiments is made of rubber. It serves to protect other surfaces from being damaged upon contact with the connector 300. For example, it can serve to protect the display screen when the laptop 350 is inadvertently closed by the user with the connector 300 still mated to the laptop 350. The finger indent affordance 321 indicates the desired contact area where a user may apply a downwards force on the connector 300 to disconnect said connector insert housing 320 from said computing device 350.

Figure 16:
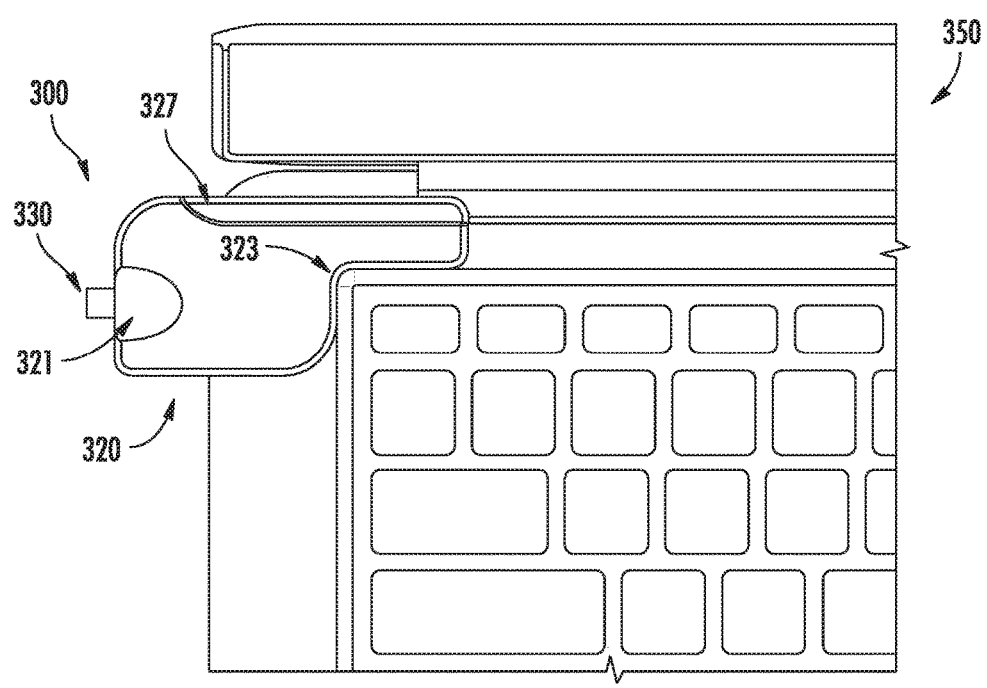
FIG. 16 is a top view of the connector and the computing device of FIG. 15.

FIG. 16 is a top view of the connector 300 and the computing device 350 of FIG. 15. In embodiments, the length of the protective edge strip 327 may vary depending on the length of the connector insert housing 320 extending across the surface of the computing device 350. In embodiments, the size and position of the finger indent affordance 321 may vary depending on the size of the connector insert housing 320 and the positioning of the cable end 330. The visual alignment guide 323 provides a visual indication that allows a user to easily align the connector (i.e., align the connector insert 310 with the connector receptacle (not shown) of the computing device 350) during the mating process to obtain proper mating, as its contours follows, in embodiments, the perimeter contours of the keyboard area of the computing device 350.

FIG. 17 is a side view (from direction B-B in FIG. 15) of the connector 300 of FIG. 15. The positioning of the visual alignment guide 323 may be different depending on the design of the computing device 350 to which the connector 300 is to attach.

In embodiments, the connector insert housing 320 and the connector insert 310 may be (though not necessarily) designed as separate parts. This allows a user to attach connector insert housings of different dimensions to the same connector insert, depending on the computing device of choice. The cable end 330 may be configured to connect to the connector insert 110 directly or via the connector insert housing.

Figure 18:
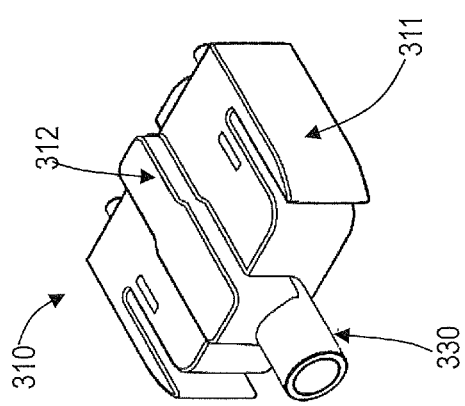
FIG. 18 is a bottom perspective view of the connector insert, according to the embodiment of FIG. 15.

FIG. 18 shows a bottom perspective view of the connector insert 310. The connector insert 310 comprises a locking tab 312 and an elastic spring mechanism 311.

Figure 19:
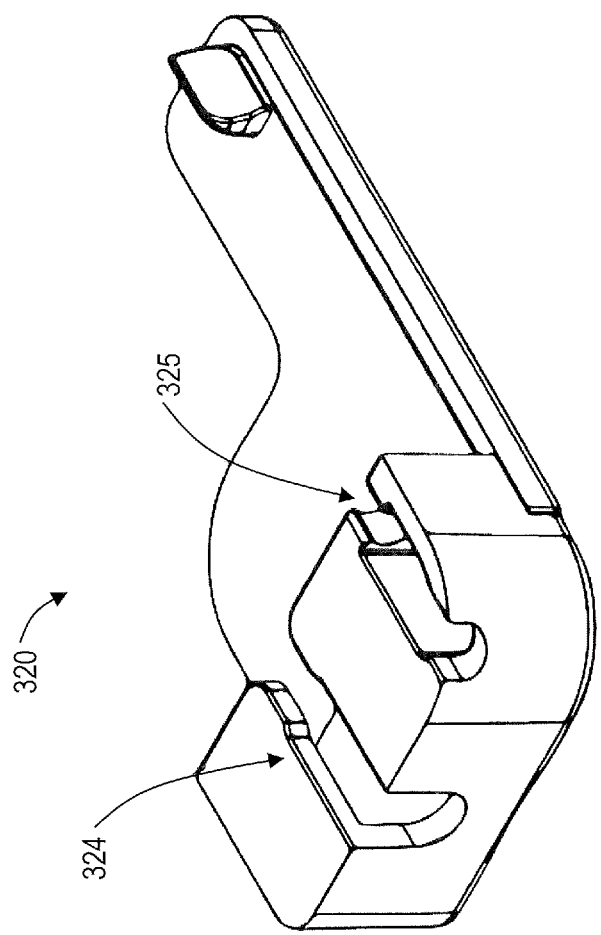
FIG. 19 is a bottom perspective view of the connector insert housing, according to the embodiment of FIG. 15.

FIG. 19 shows a bottom perspective view of the connector insert housing 320. The connector insert housing 320 comprises a dual width locking channel 324 and a cable holder receptacle 325. The dual width locking channel 324 is designed for mating with the locking tab 312 of the connector insert 310.

FIG. 20A and FIG. 20B show bottom cross section views of the connector with the connector insert 310 inserted into the cavity of the connector insert housing 320. FIG. 20A shows the elastic spring mechanism 311 of the connector insert 310 in an uncompressed position while FIG. 20B shows the elastic spring mechanism 311 of the connector insert 310 in a compressed position. The cavity of the connector insert housing 320 has a larger width at its open end, a smaller width at its closed end, and is sized to allow the connector insert 310 therewithin. In embodiments, the transition from the larger width to the smaller width occurs via one or more width diminishing steps 326. This transition in width (for example, caused by the width diminishing step 326) serves to compress the elastic spring mechanism 311 of the connector insert 310 causing the connector insert 310 to have a natural tendency to protrude outwards from the cavity of the connector insert housing 320. As such, this elastic spring mechanism 311 maintains pressure between the plurality of first electrical contacts within the connector insert 310 and the second electrical contacts (e.g. pins) of the computing device's connector receptacle 360. The spring action also serves, by the opposing action on the connector insert housing 320, to pull the end portion 322 tightly against the edge of the space (between the display screen and the main body of the laptop) into which it is inserted by means of slightly pushing the connector insert housing 320 away from the computing device. Both the elastic spring mechanism 311 and the locking channel 324 is made of a resilient material (e.g. plastic) to allow for the above-noted spring action.

Figure 21A:
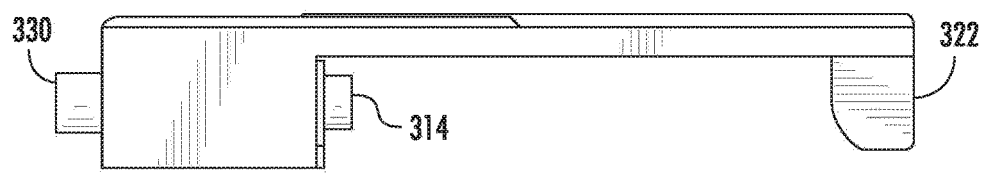
FIG. 21A-21B are side views of the combination of the connector insert housing and the connector insert housed therein.
Figure 21B:
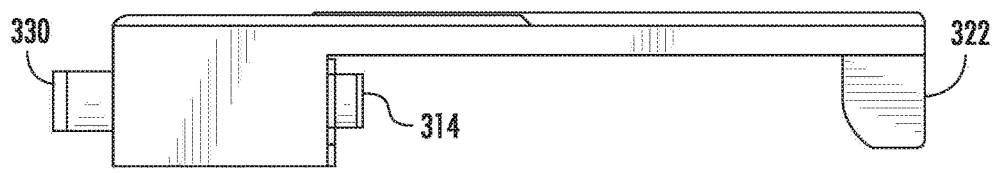

FIG. 21A-21B show side views of the combination of the connector insert housing 320 and the connector insert 310. The connector insert 310 protrudes from the clip connector receptacle as shown (see protrusion 314 in FIG. 21A) when the connector is not mated with the computing device. When the connector is properly mated to the computing device, the protrusion 314 decreases as the end portion 322 is inserted into its final position (as shown in FIG. 21B). This pulls the face of the connector insert 310 tightly against the connector receptacle 360 of the computing device 350.

Figure 21C:
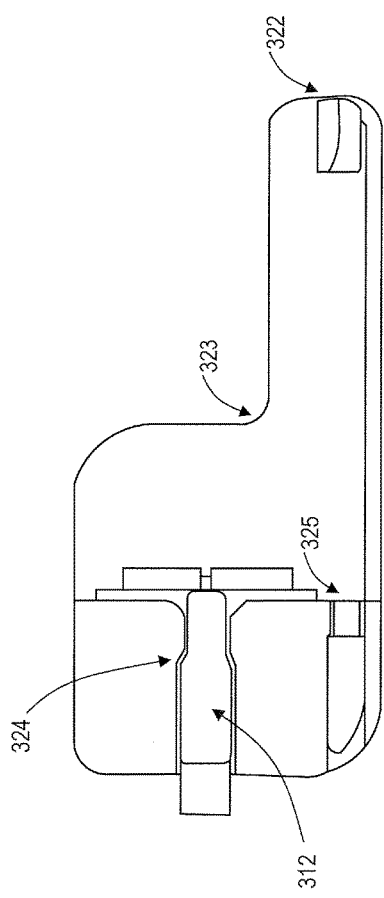
FIG. 21C-21D are bottom views of the combination of the connector insert housing and the connector insert housed therein.
Figure 21D:
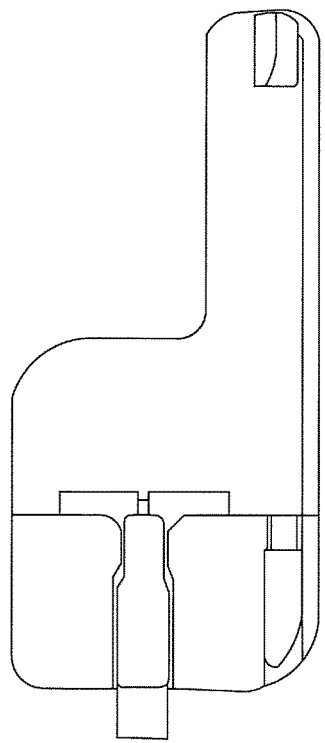

FIG. 21C-21D show bottom views of the combination of the connector insert housing 320 and the connector insert 310. The locking tab 312 on the connector insert 310 enters the locking channel 324. The locking channel 324 expands in width upon initial insertion of the connector insert 310 but returns to its initial width after the connector insert 310 is fully mated with the connector insert housing 320, as shown in FIG. 21D. This keeps the connecter insert 310 held securely mated inside the connector insert housing 320, and prevents both of them from easily becoming detached from each other even when the connector is not mated to a computing device.

FIG. 22A-22B show bottom perspective views of the combination of the connector insert housing 320 and connector insert 310, separated and attached to a cable 331. A cable holder receptacle 325 provides a mechanism to attach a cable 331. In embodiments the same cable 331 is attached to the cable end 330. The diameter of the cable holder receptacle 325 is slightly less than the cable 331 itself to allow for a tight fit of the cable 331 upon insertion into the cable holder receptacle 325 as shown in FIG. 22B.

FIG. 23A-23B shows perspective and top views of a connector 400 according to a fourth embodiment of the present disclosure, mating and mated, to a connector receptacle 460 of the computing device 450 (a cross-section of the computing device is shown in FIG. 23B). The connector 400 (having a cable end 430) comprises an anchor plug 422 that inserts into an available port 451 on the computing device 450 and ensures that the connector 400 is properly aligned inside the connector receptacle 460. In embodiments the anchor plug 422 is made of plastic or rubber and, through friction, snuggly resides in the port 451. The anchor plug 422 also holds the electrical pins of the connector insert 402 tightly mated against the second set of electrical contacts contained within the computing device's connector receptacle 460. The port 451 can be directly adjacent (i.e., be a neighbour) to the computing device's connector receptacle 460, or have a plurality of intermediate ports between itself and the computing device's connector receptacle 460. The port 451 can be located on either side of the computing device's connector receptacle 460.

FIG. 24A-24B shows perspective and top views of a connector 500, according to a fifth embodiment of the present disclosure, mating and mated, to a connector receptacle 560 of a computing device 550. The connector 500 (having a cable end 530) comprises multiple anchor plugs 521, 523. The connector 500 may consist of a plurality of anchor plugs 521, 523 in addition to the connector insert 510 that houses the first set of electrical pins. The plurality of anchor plugs 521, 523 can be arranged in any combination of orientations around the connector insert 502. Each anchor plug 521, 523 should align with an available port 551, 553 on the face of the computing device 550, when the connector insert 502 is mated with the connector receptacle 560 of the computing device 550.

Figure 25A:
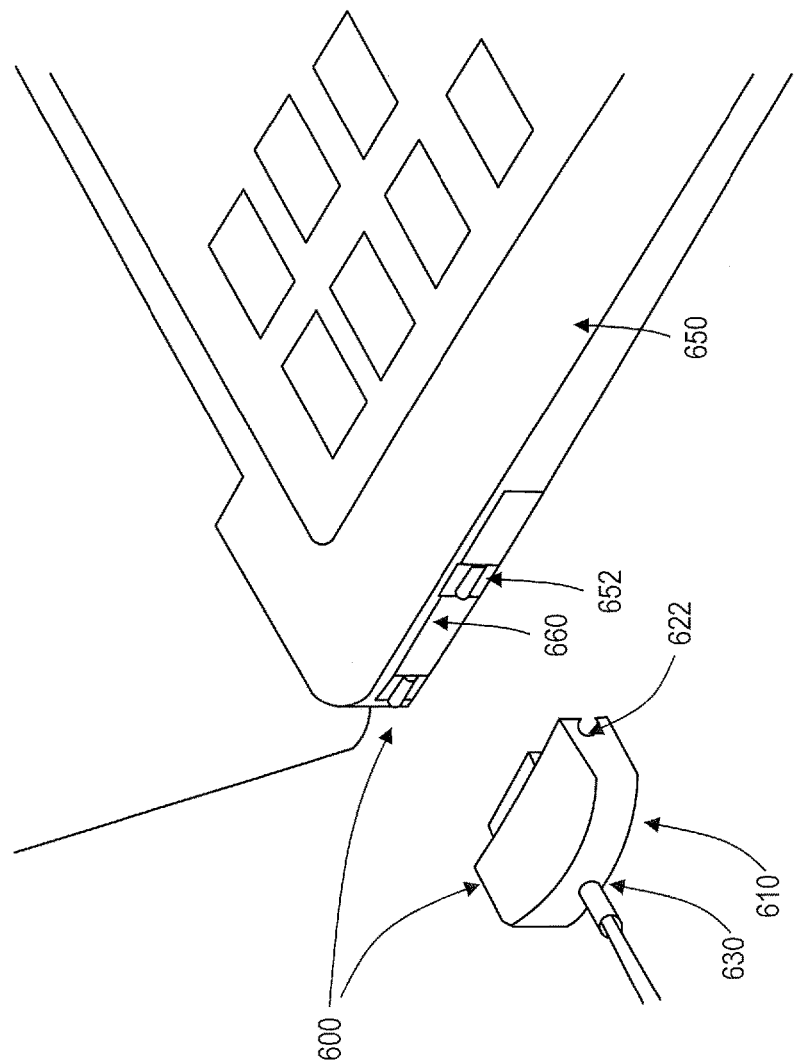
Figure 25C:
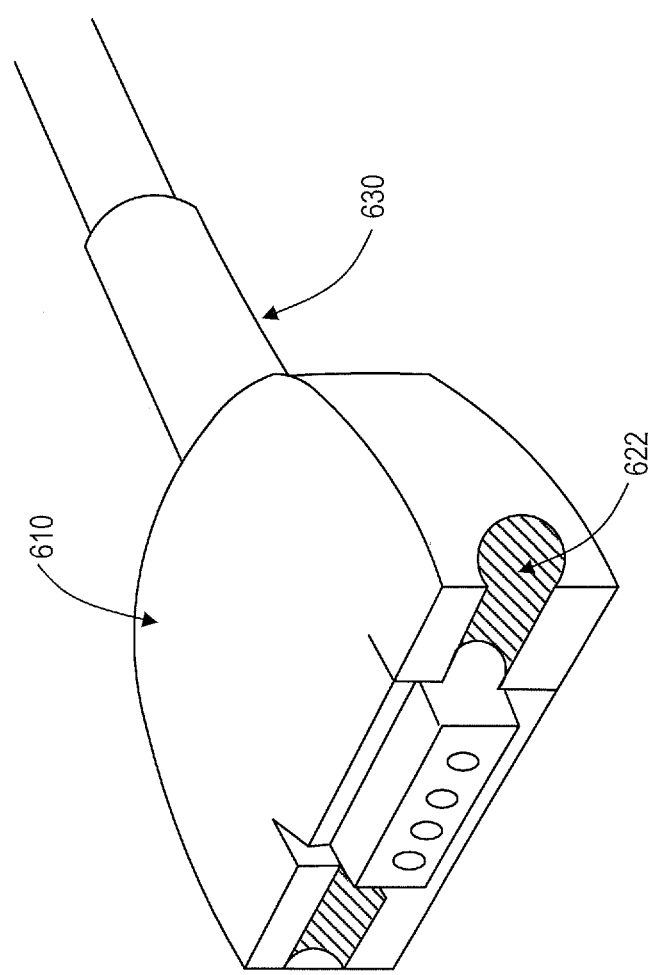

FIG. 25A-25C show perspective (back and front) and side views of a connector 600, according to a sixth embodiment of the present disclosure, mating and mated, with a connector receptacle 660 of a computing device 650. The embodiment comprises a mechanical latching system between the connector 600 and the computing device 650 containing the mating connector receptacle 660. The connector 600 (having a cable end 630) houses one or more receptacles 622 that fasten to corresponding rods 652 attached to the computing device 650. In embodiments, the rods 652 are made of plastic or rubber and may be attached to the computing device 650 with an adhesive material. In the connected position, i.e., when the rods 652 are connected to the receptacles 622, the first set of electrical contacts inside the connector insert 610 are held securely in place against the pins inside the connector receptacle 660. The mechanical latching system can be disengaged by force applied on the connector 600 in a direction away from the computing device 650.

Figure 26A:
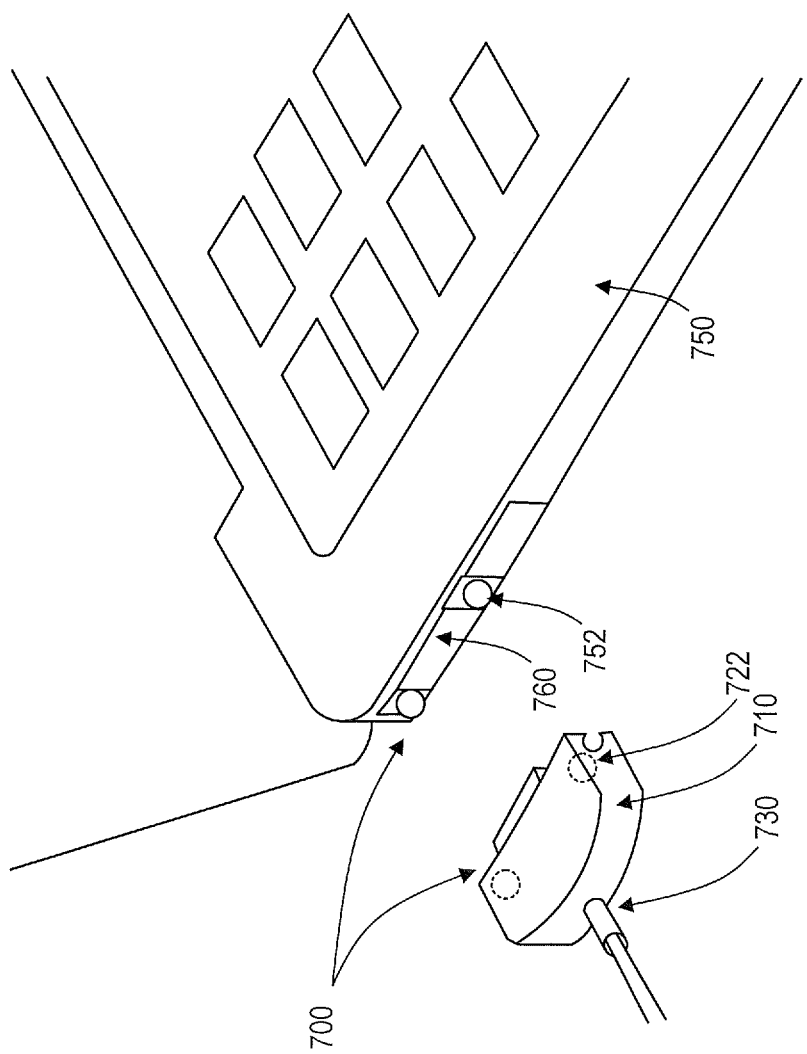

FIG. 26A-26B show perspective views of a connector 700, according to a seventh embodiment of the present disclosure, mated with a connector receptacle 760 of a computing device 750. The embodiment comprises a mechanical latching system between the connector 700 (having a cable end 730) and the computing device 750 containing the mating connector receptacle 760. The face of the connector insert housing 720 contains one or more sockets 722 that fasten to corresponding balls 752 attached to the computing device 750. In embodiments, the balls 752 are made of plastic or rubber and may be attached to the computing device 750 with an adhesive material. In the mated position, the first set of electrical contacts 712 inside the connector insert 710 are held securely in place against the second set of pins inside the connector receptacle 760. The mechanical latching system can be disengaged by force applied on the connector 700 in a direction away from the computing device 750.

FIG. 27A-27C show perspective (back and front) and side views of a connector 800 (having a cable end 830), according to an eighth embodiment of the present disclosure, mating and mated with a connector receptacle 860 of a computing device 850. The embodiment comprises a hook and loop fastener system (exemplarily, a Velcro™) between the non-magnetic connector insert housing 820 and the computing device 850 containing the mating connector receptacle 860. One of the surfaces of the connector insert housing 820 contains one or more pads 822 of hook material that fasten to one or more corresponding pads of loop material 852 on the surface of the computing device 850. Alternately, the hook material could be on the surface of the computing device and the loop material could be on the connector surface. FIG. 27D-27E show another embodiment where the loop material could also be on either or both sides of the connector receptacle 860 of the computing device.

Figure 28A:
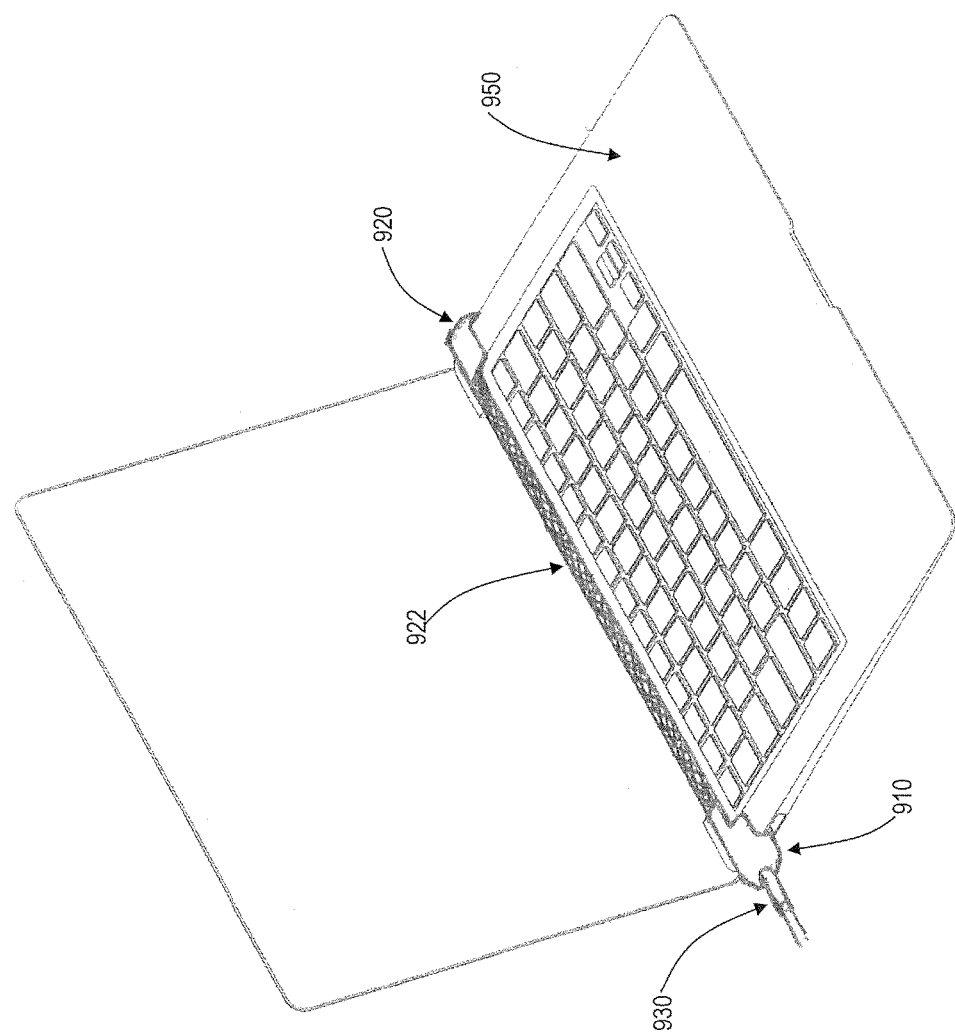
FIG. 28A-28B show perspective and top views of a connector, according to a ninth embodiment of the present disclosure, mated with the connector receptacle of a computing device.
Figure 28B:
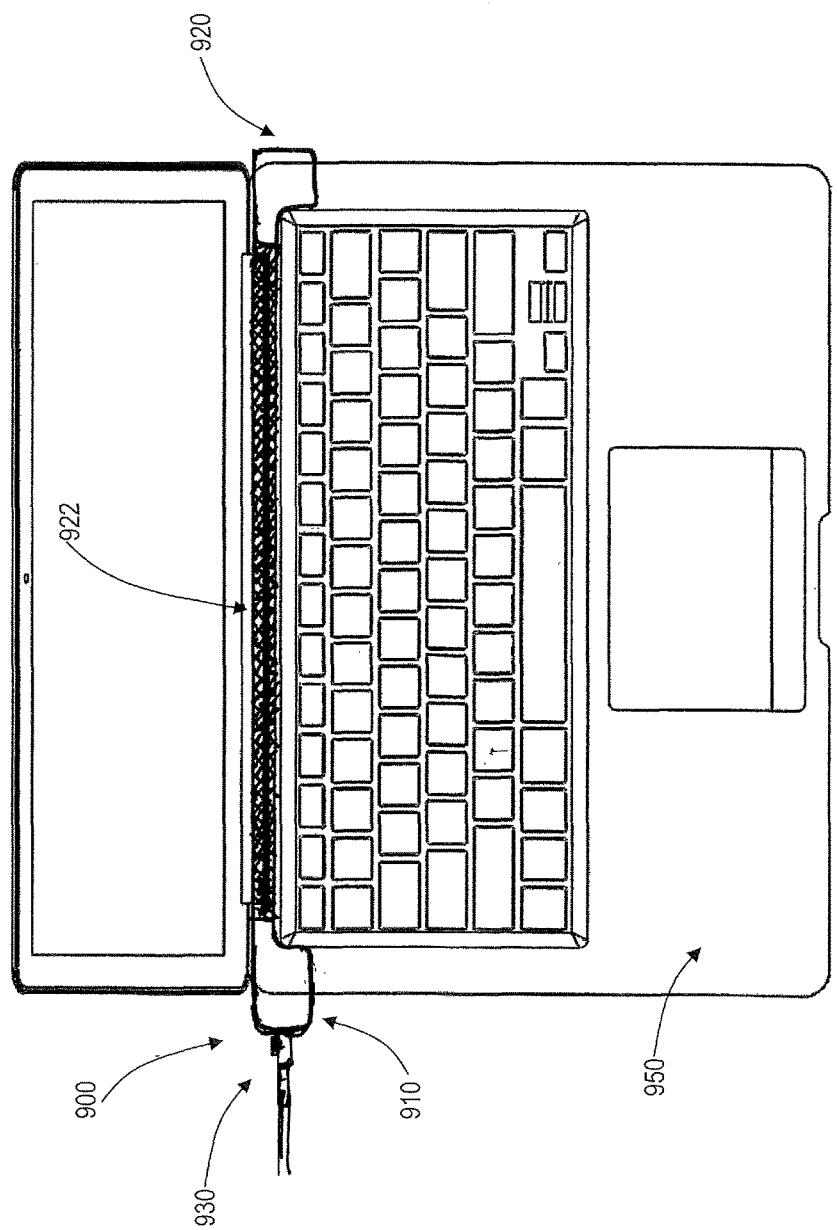

FIG. 28A-28B show perspective and top views of a connector 900 (having a cable end 930), according to a ninth embodiment of the present disclosure, mated with a connector receptacle of a computing device 950. The embodiment comprises a connector insert 910 joined to a clip 920 by an elastic section 922. In embodiments, this elastic section 922 can be made of rubber or elastic fabric. The clip 920 attaches to the far edge of the computing device 950 and, through elasticity, pulls the connector 910 into tight contact with the computing device's connector receptacle. The overall shape of the connector 900 could be different than what is shown in FIG. 28A-28B.

FIG. 29-31 show side views of three sequential stages of the connector from FIG. 28A-28B being mated with a connector receptacle 960 of a computing device 950. The elastic action of the elastic section 922 joining the connector 900 and the clip 920 is illustrated. The clip 920 that attaches to the far side edge of the computing device 950 is shown secured in FIG. 31.

While the above embodiments describe how connectors can deliver power from a power source connected to its cable end (whether a conventional AC power supply or a battery pack), similar approaches can also be used to transfer power from a case that is removable from the computing device.

Figure 32A:
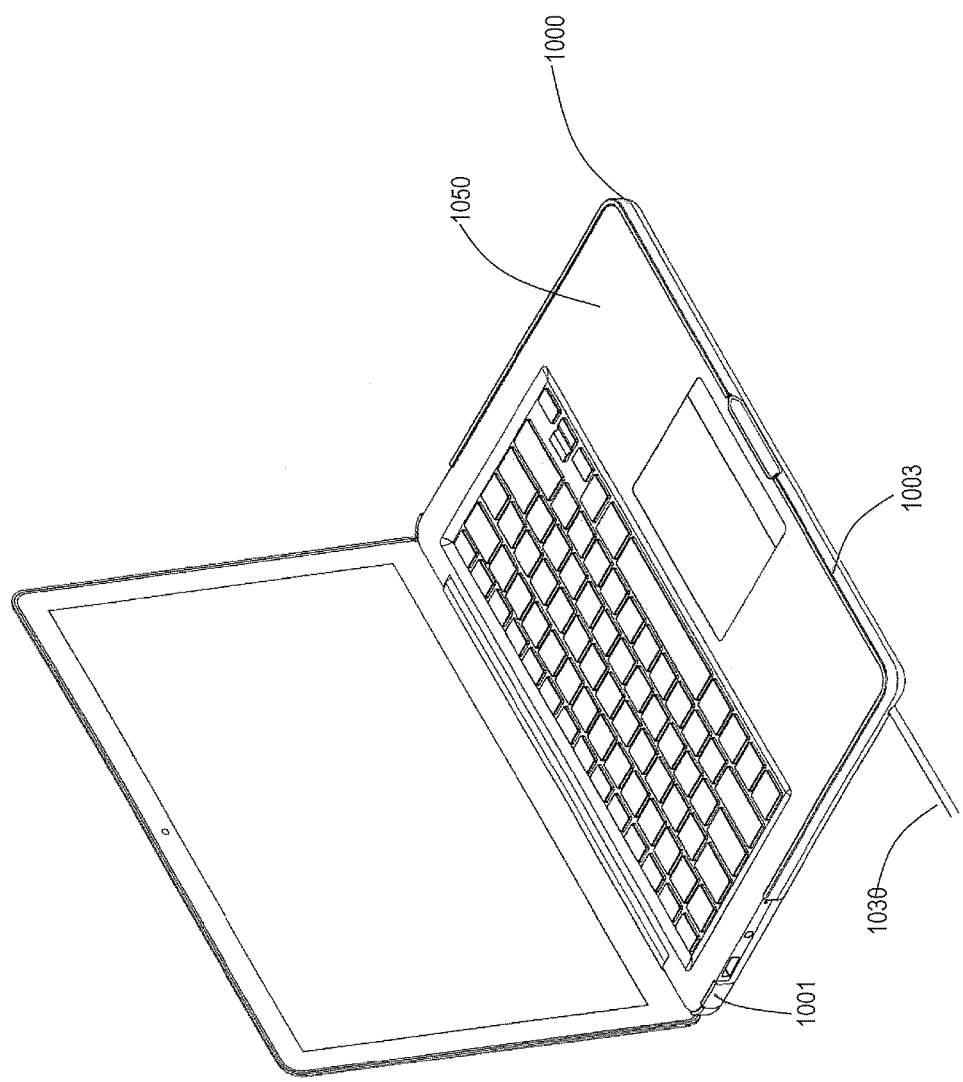
FIG. 32A-32B show perspective and side views of a case mated with a computing device, according to a tenth embodiment of the present disclosure.
Figure 32B:
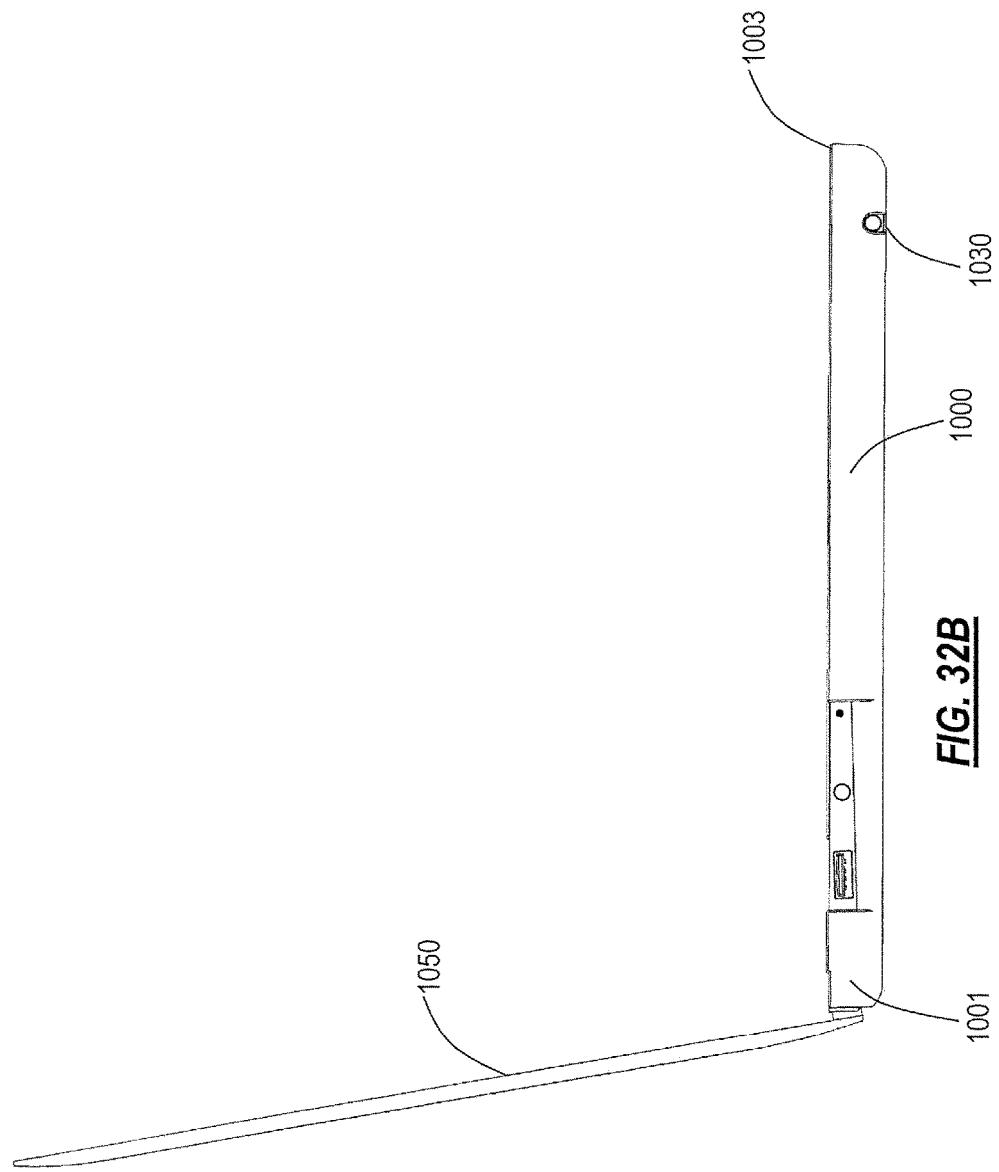
Figure 34A:
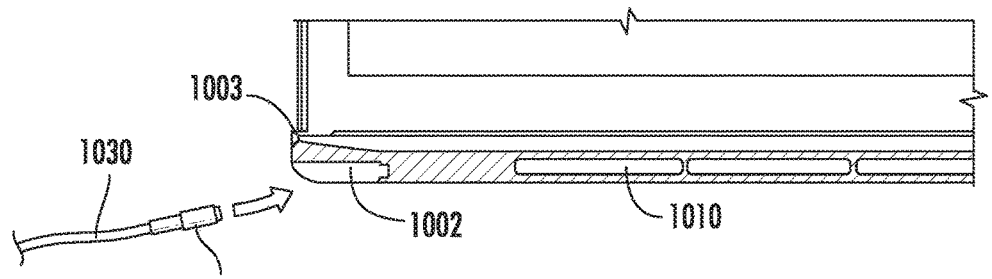
FIG. 34A-34C show side views of three sequential stages of a connector insert mating to the receptacle cavity of the case of FIG. 32A-33B.
Figure 35A:
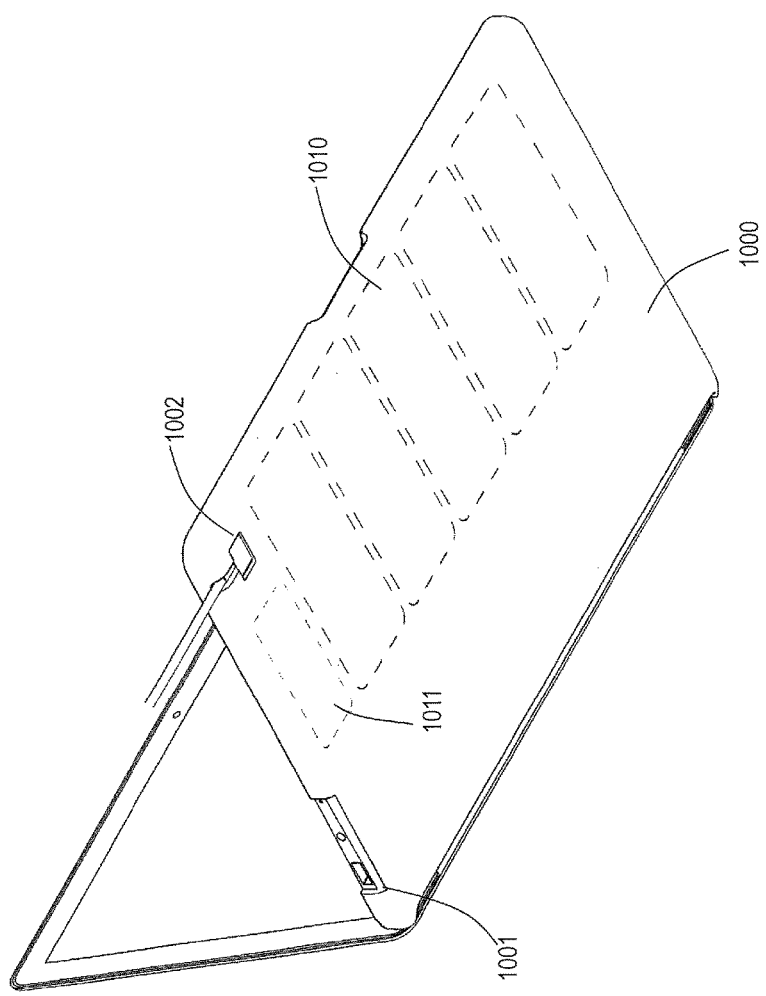
FIG. 35A-35B show bottom and top perspective views of the case of FIG. 32A-32B (shown attached to the computing device in FIG. 35A) showing its batteries and battery management system (in dotted lines).

FIG. 32A-32B show perspective and side views of a case 1000 for a computing device 1050, according to a tenth embodiment of the present disclosure, that houses a battery 1010 (shown in the view in FIG. 35A) and battery management system 1011 (shown in the view in FIG. 35A). The case 1000 connects to a connector receptacle 1060 (shown in the view in FIG. 33A) of the computing device 1050 via an interposer 1001. A cable 1030, attached to a connector insert 1031 (e.g. a Magsafe connector) (shown in the view in FIG. 33A), inserts to a receptacle cavity 1002 (shown in the view in FIG. 34A) of the case 1000. The interposer 1001 provides electrical connectivity from the plurality of electrical connections in the receptacle cavity 1002 to the plurality of electrical connections in the connector receptacle 1060 (shown in the view in FIG. 33A) of the computing device 1050. The case 1000 has a clip edge 1003 that fastens the case to the computing device 1050. Upon inserting the computing device 1050, into the case 1000, the clip edge 1003 bends outward to accommodate the insertion of the computing device 1050. After the computing device 1050 is inserted fully, the clip edge 1003 returns to its initial position around the perimeter of the upper surface of the computing device 1050.

Figure 33A:
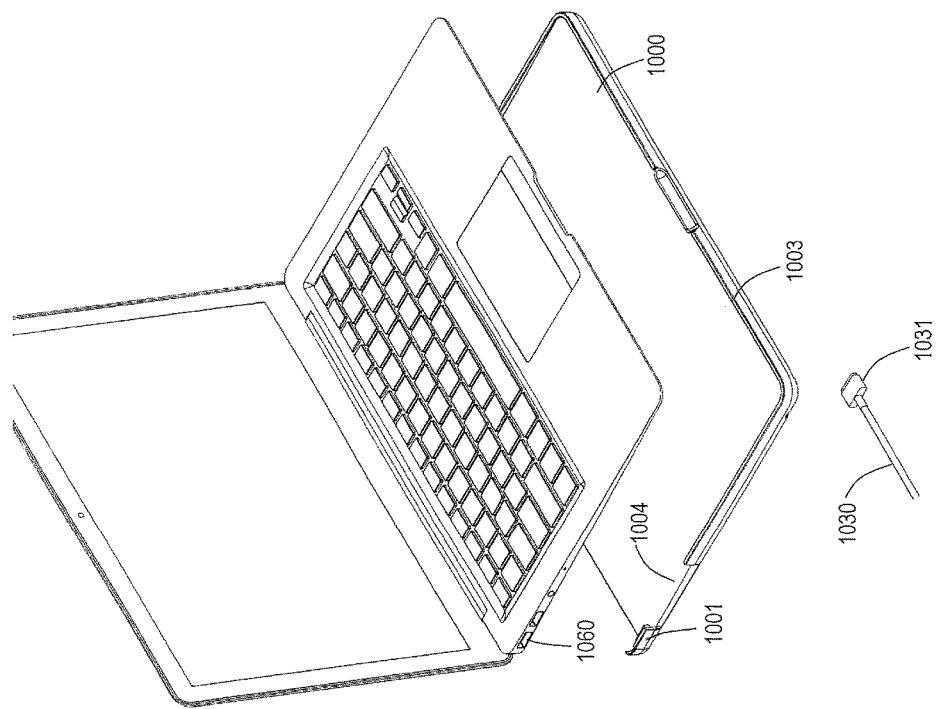
FIG. 33A-33B show exploded perspective and side views of the case and the computing device of FIG. 32A-32B.
Figure 33B:
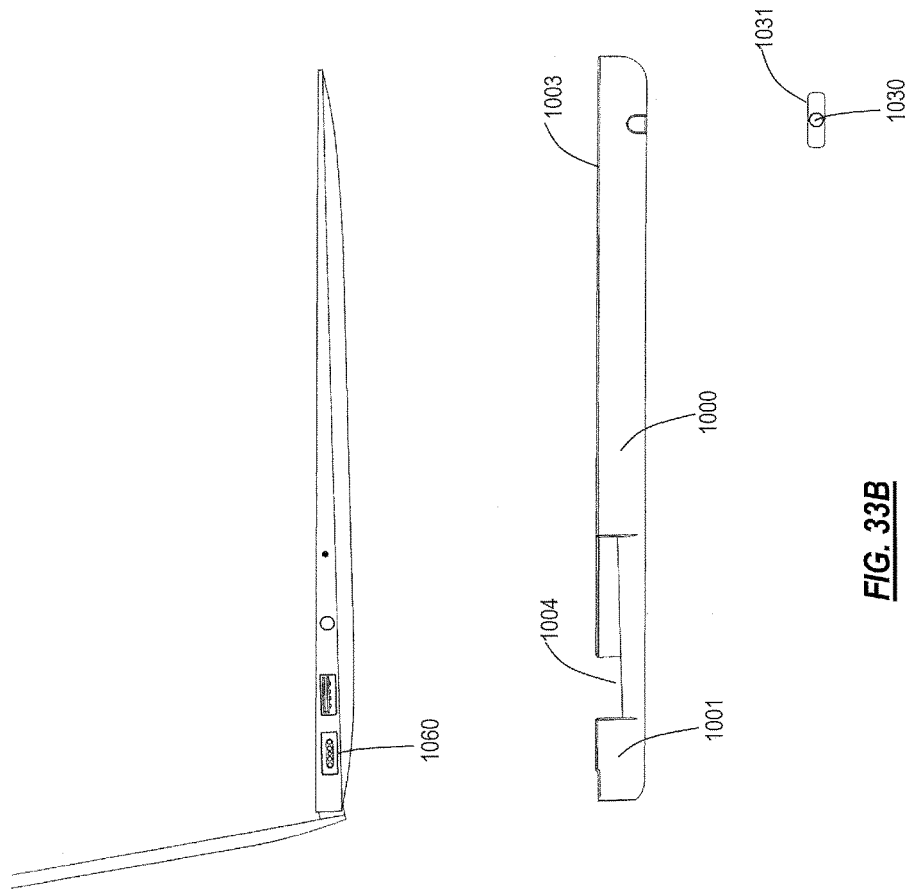
Figure 34B:
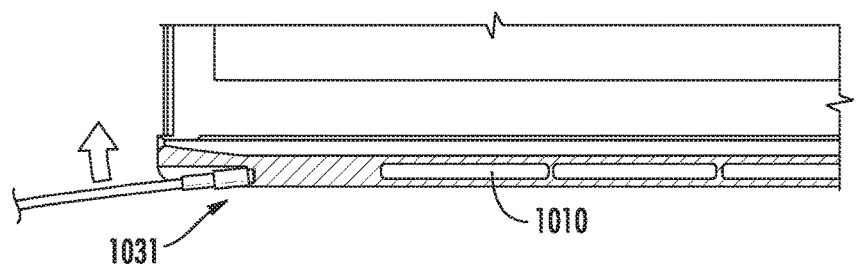
Figure 34C:
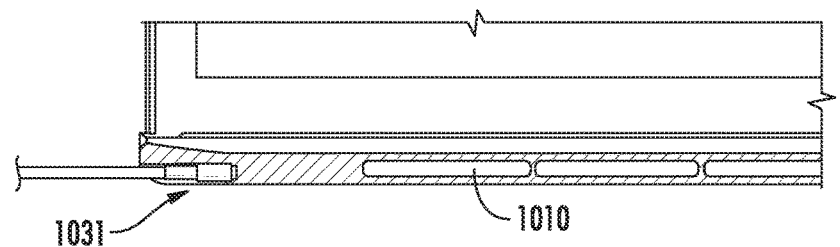

FIG. 33A-33B show exploded perspective and side views of the case 1000 and the computing device 1050 of FIG. 32A-32B. In this embodiment the interposer 1001 is connected via electrical connections to the receptacle cavity 1002 (shown in the view in FIG. 34A) on the exterior of the battery case 1000. A gap 1004 in the case 1000 allows for access to other ports on the computing device 1050. The location of the receptacle cavity 1002 relative to the interposer 1001 may be different depending on the shapes of the computing device and the case 1000. In the embodiments of FIG. 34A-34C, the receptacle cavity 1002 of the case 1000 was chosen to be at the front end on account of the tear drop shape of the computing device 1050 (best depicted in the top view of FIG. 33B).

FIG. 34A-34C show side views of three sequential stages of the connector 1031 mating to the receptacle cavity 1002. Once the connector insert 1031 is placed within the receptacle cavity 1002, an upward motion of the cable 1030 pushes the connector insert 1031 into its final resting position. Via electrical connections (not shown), the receptacle cavity 1002 is connected to the interposer 1001 either directly or via the battery management system 1011 (shown in the view in FIG. 35A) to allow electrical power to flow thereto.

Figure 35B:
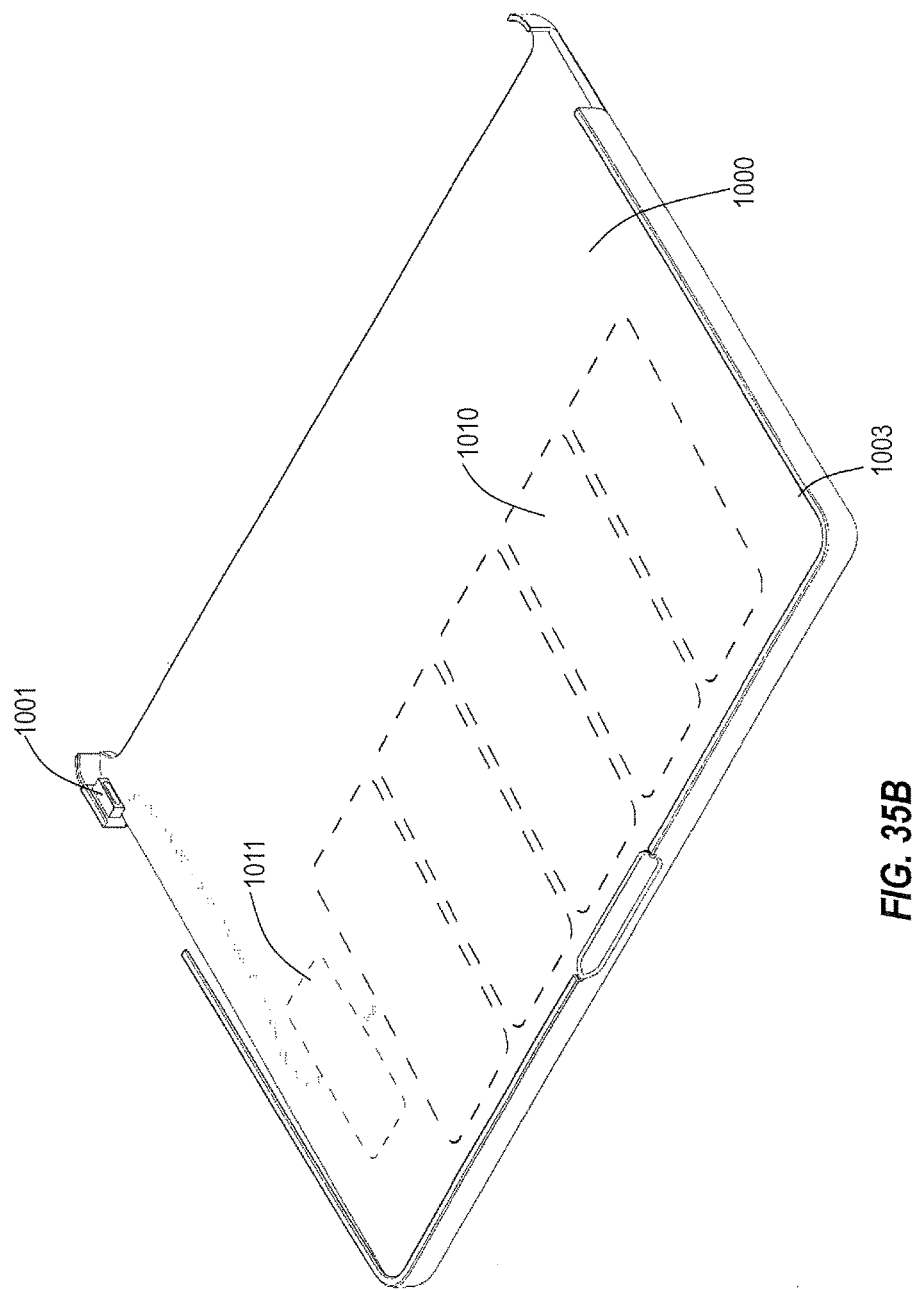

FIG. 35A-35B show bottom and top perspective views of the case 1000 of FIG. 32A-32B (shown attached to the computing device 1050 in FIG. 35A) showing the batteries 1010 and the battery management system 1011. FIG. 35A shows that in embodiments the receptacle cavity 1002 for the connector insert 1031 is located on the exterior of the case 1000, with an opening for the cable 1030 on the side of the receptacle cavity 1002. In embodiments, the battery management system 1011 is connected to the interposer 1001 via a plurality of electrical wires housed in the case 1000, as shown in FIG. 35A. The wires route the power from the receptacle cavity 1002 to the interposer 1001 via the battery management system 1011. In other embodiments, wires housed within the case 1000 may route the power from the receptacle cavity 1002 to the interposer 1001 directly.

Figure 36:
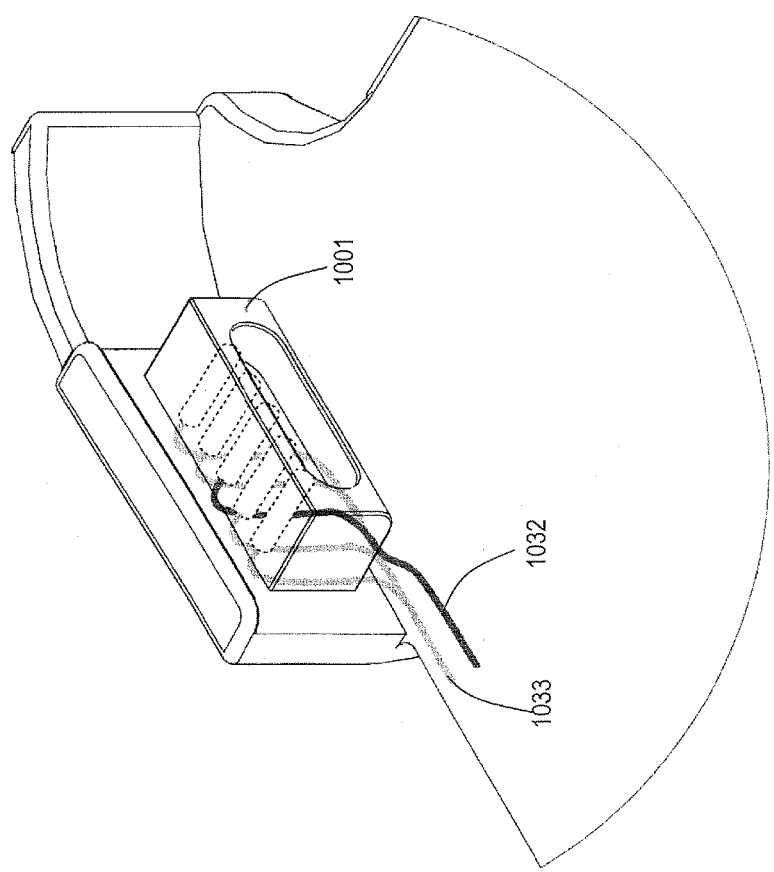
FIG. 36 shows a perspective view of an interposer of the case of FIG. 32A-32B.
Figure 37A:
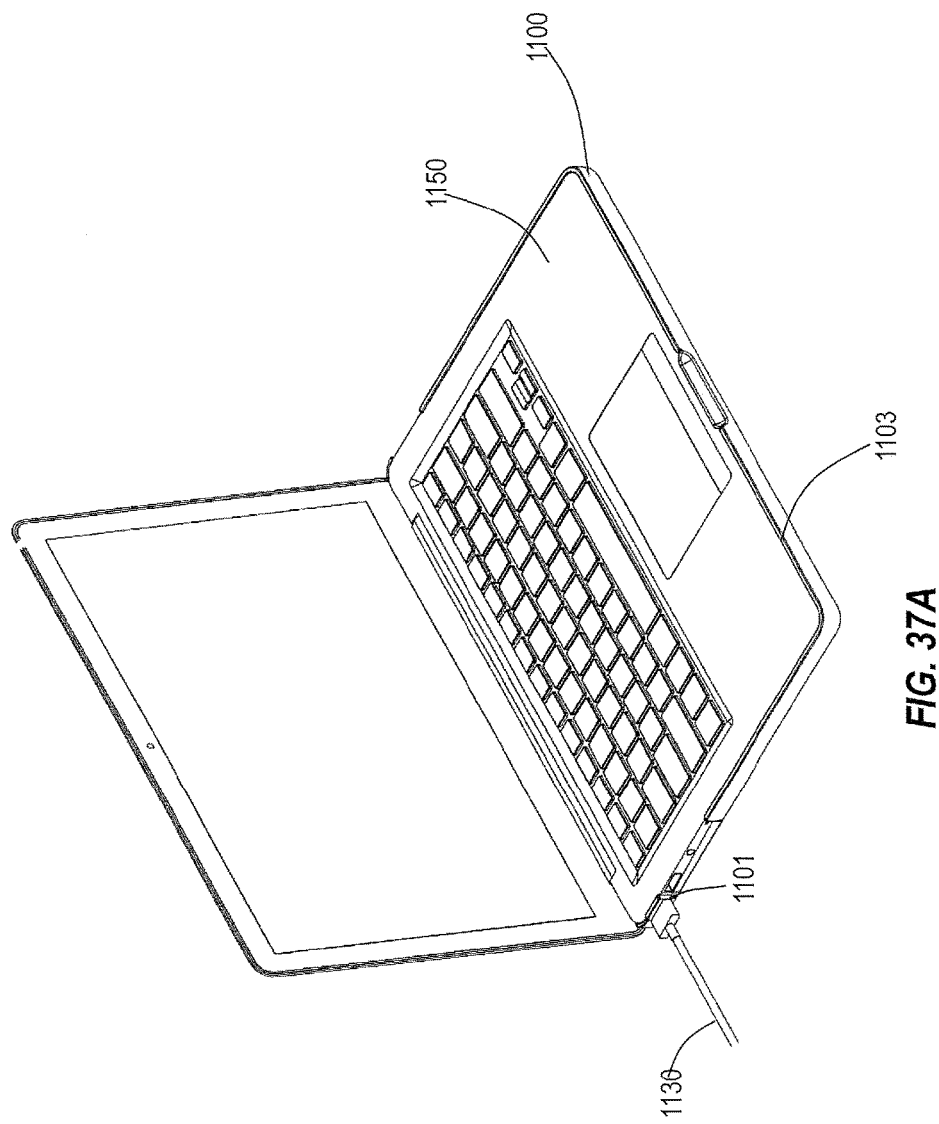
FIG. 37A-37B show perspective views of a case, according to an eleventh embodiment of the present disclosure, mated with and separate from a computing device.
Figure 37B:
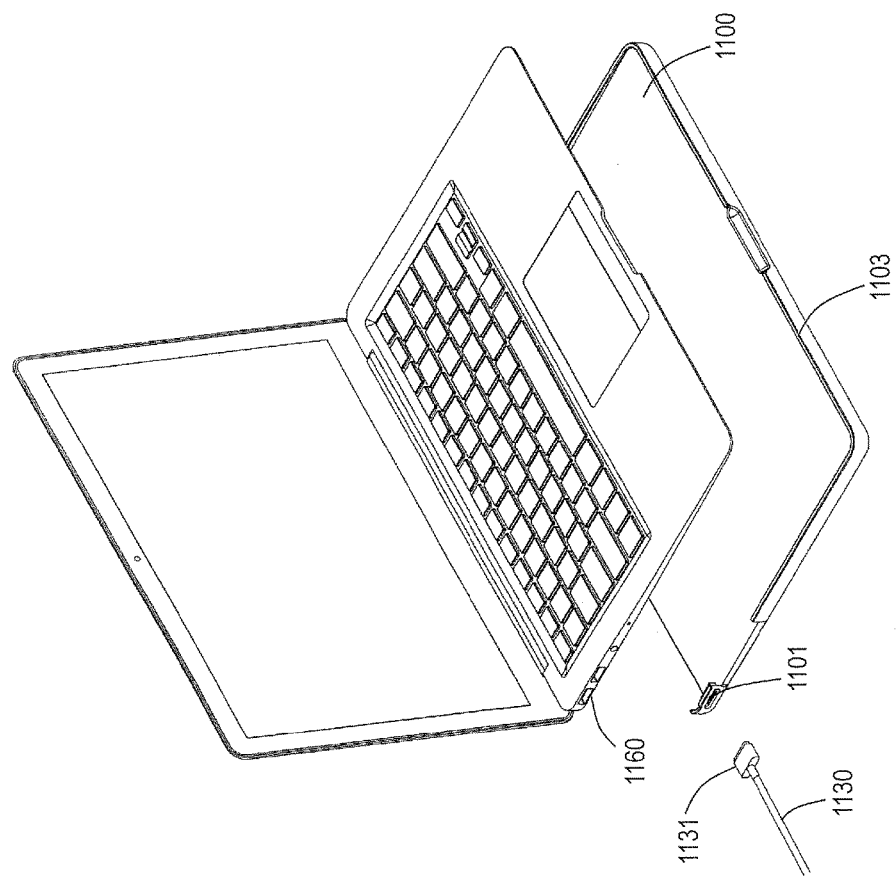

FIG. 36 shows a perspective view of the interposer 1001 connected to the case 1000 of FIG. 32A-B. The interposer 1001 connects to the connector receptacle 1060 of the computing device 1050. In embodiments the interposer 1001 is made of rubber or plastic and is held mated with the connector receptacle 1060 of the computing device 1050 by the case 1000. The interposer 1001 may be part of the case 1000 or its own separate piece. The interposer 1001 comprises a plurality of electrical connections 1032, 1033 that couple to the second set of electrical FIG. 37A-37B show perspective views of a case 1100 according to an eleventh embodiment of the present disclosure, mated with and separate from a computing device 1150, that houses a battery pack 1110 and battery management system 1111 (both of which are shown in the view in FIG. 40A). FIG. 37A shows a view where the case 1100, computing device 1150, and a cable 1130 attached to a connector insert 1131 (shown in the view in FIG. 37B), are mated together. The case 1100 separated from the computing device 1150 can be seen in FIG. 37B.

Figure 38A:
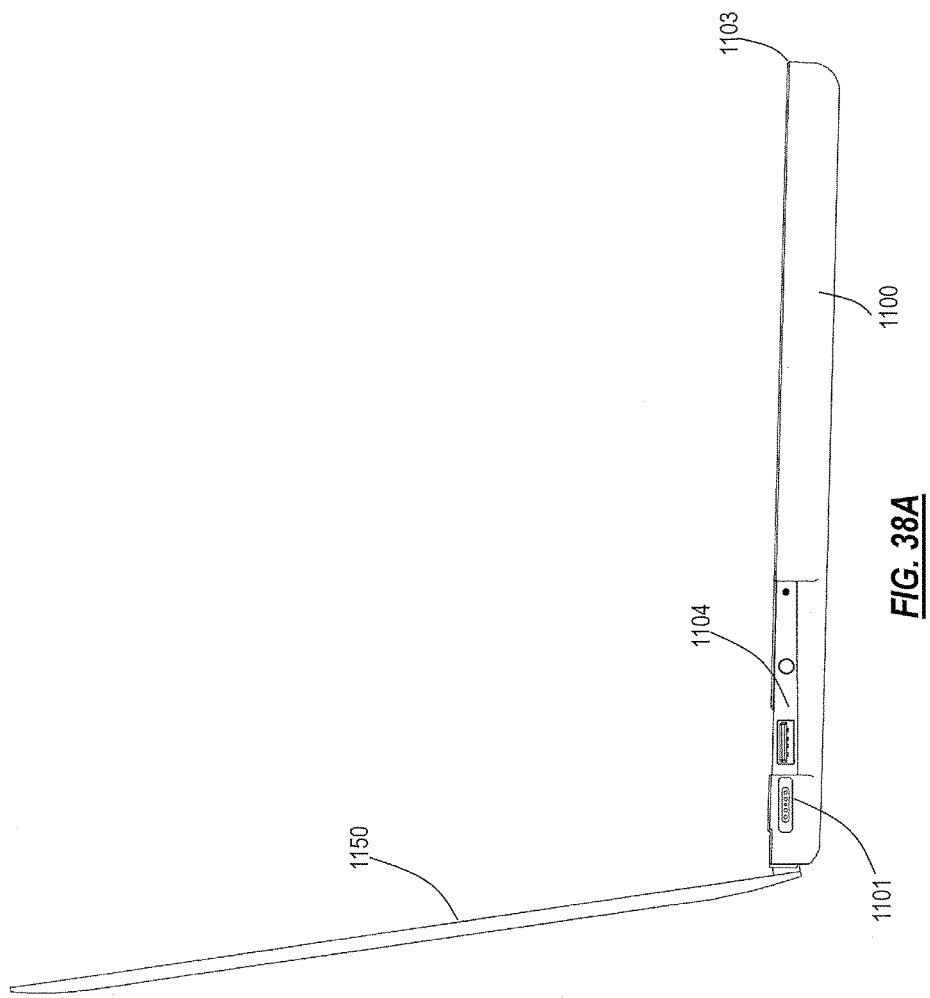
FIG. 38A-38B show side views of the case and the computing device of FIG. 37A-37B.
Figure 38B:
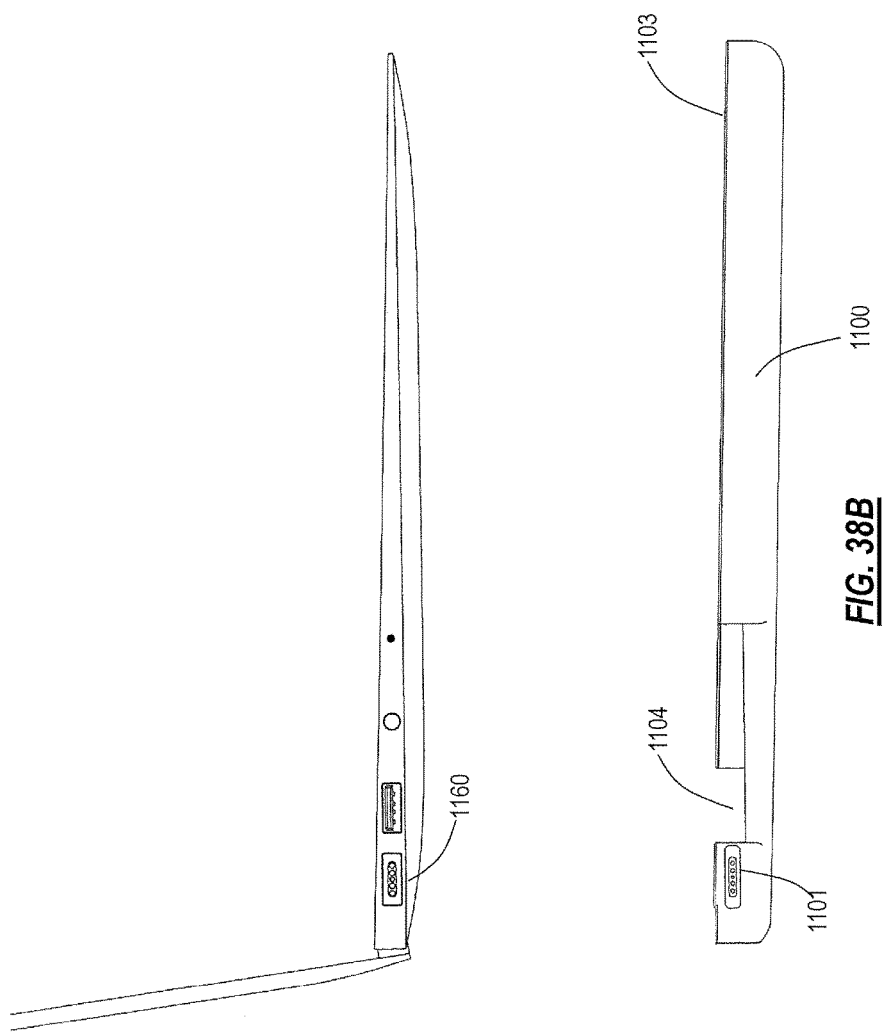

FIG. 38A-38B show side views of the case 1100 of FIG. 37A-37B. The case 1100 connects to a connector receptacle 1160 (shown in the view in FIG. 37B) of the computing device 1150 via the interposer 1101. In this embodiment the connector insert 1131 and the cable 1130 are the existing connection solution for the computing device 1150. The interposer 1101 of the case 1100 enables this connection method to be used as intended, while also allowing electrical connection of the computing device to the battery case 1100. In this embodiment the interposer 1101 sits inside the magnetic receptacle 1160 and is thin enough to allow the ferromagnetic connector insert 1131 to be attracted, through the interposer 1101, to the magnetic connector receptacle 1160. The case 1100 has a clip edge 1103 that fastens the case to the computing device 1150. Upon inserting the computing device 1150, into the case 1100, the clip edge 1103 bends outward to accommodate the insertion of the case. After the computing device 1150 is inserted fully, the clip edge 1103 returns to its initial position around the perimeter of the upper surface of the computing device 1150. An opening 1104 in the case 1100 allows for access to existing connector ports on the computing device 1150. There is no clip edge 1103 along the length of the opening 1104.

FIG. 39A-39B show side views of two sequential stages of the ferromagnetic connector 1131 mating to the connector receptacle 1160, through the non-magnetic interposer 1101. The ferromagnetic connector 1131 positioned to mate to the connector receptacle 1160 is shown in FIG. 39A. The ferromagnetic connector 1131 mated to the connector receptacle 1160 is shown in FIG. 39B.

Figure 40A:
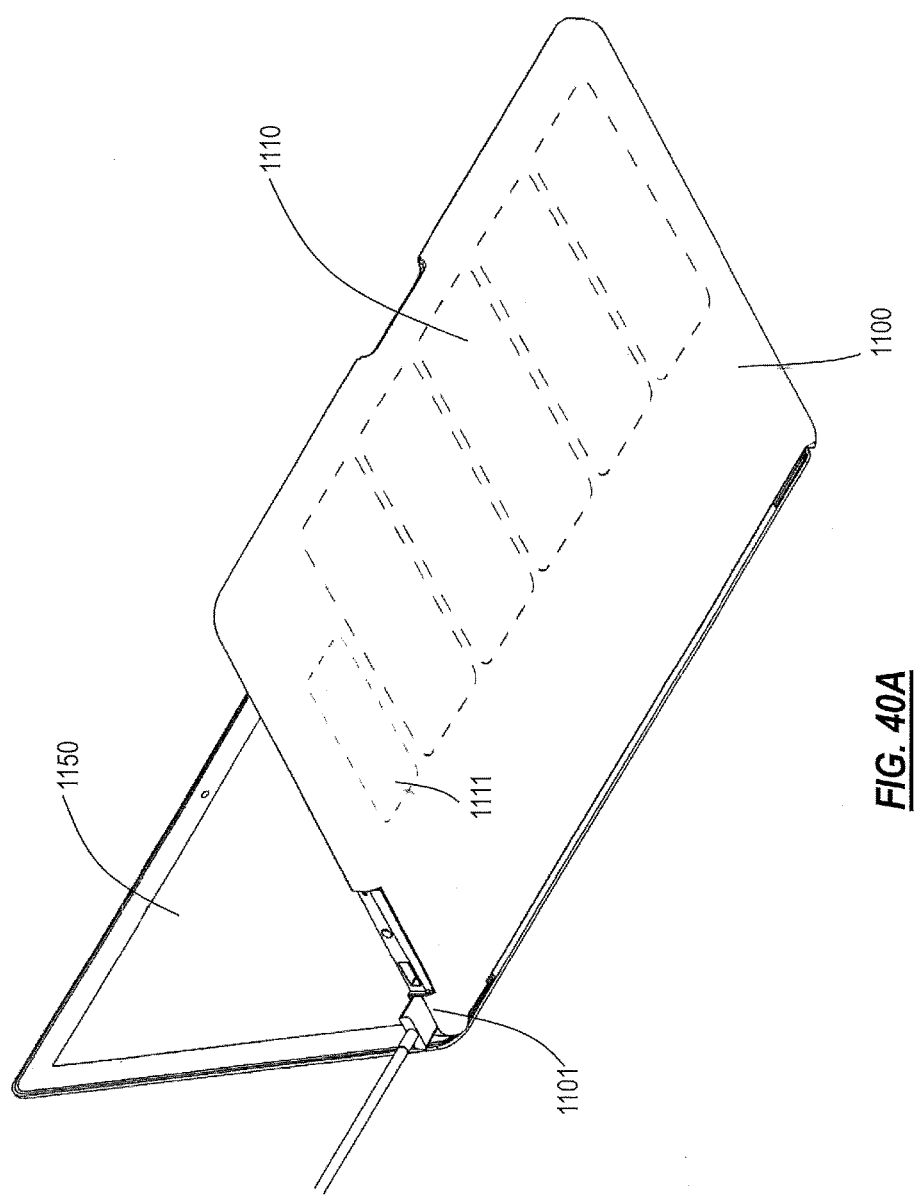
FIG. 40A-40B show bottom and top perspective views of the case (shown attached to the computing device in FIG. 40A) of FIG. 37A-37B showing its batteries and battery management system (in dotted lines).
Figure 40B:
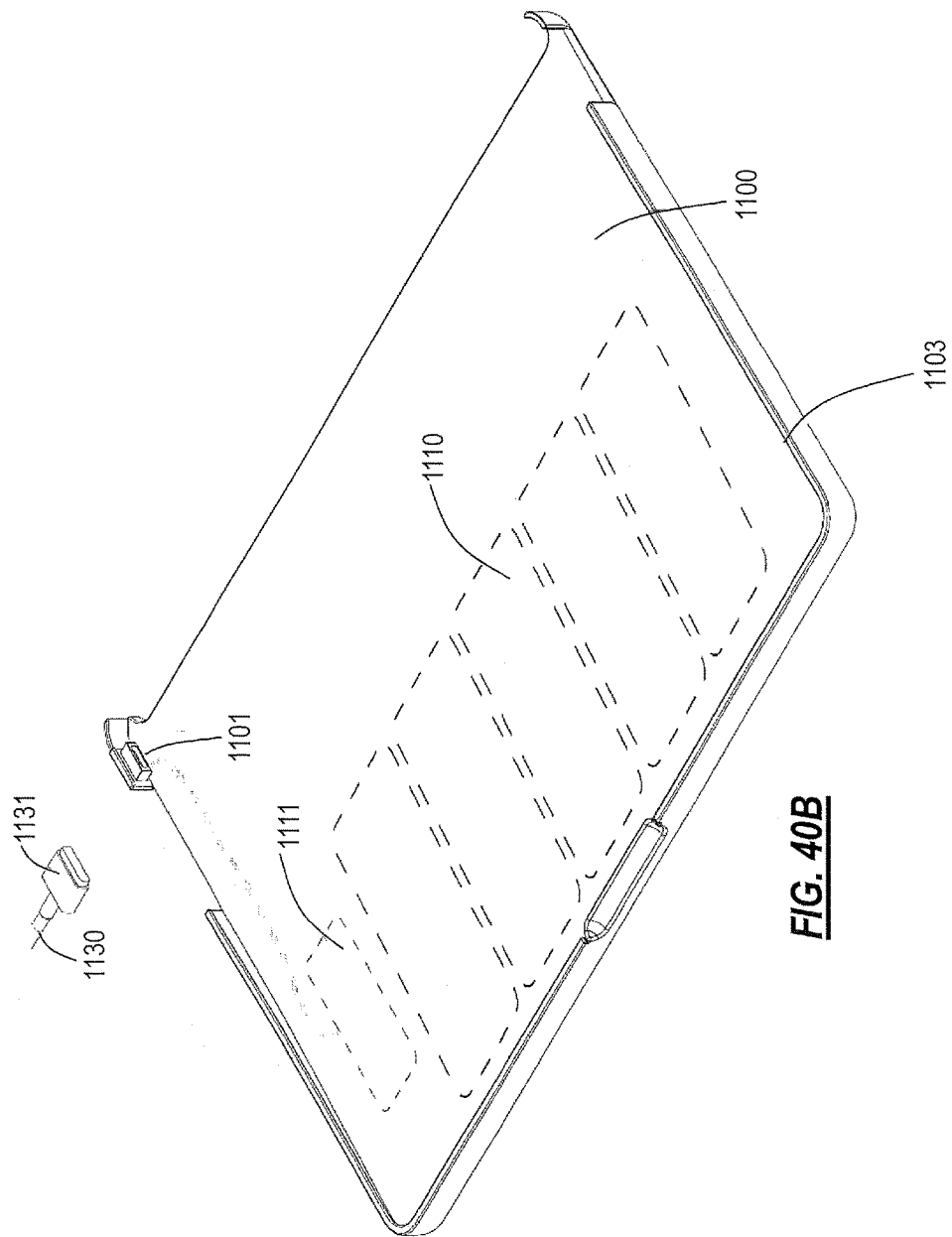

FIG. 40A-40B show bottom and top perspective views of the case 1100 (shown attached to the computing device 1150 in FIG. 40A) from FIG. 37A-B showing the batteries 1110 and the battery management system 1111. The ferromagnetic connector 1131 connects to the computing device 1150, via the interposer 1101, in the same location as it would if the case 1100 was not present.

Figure 41:
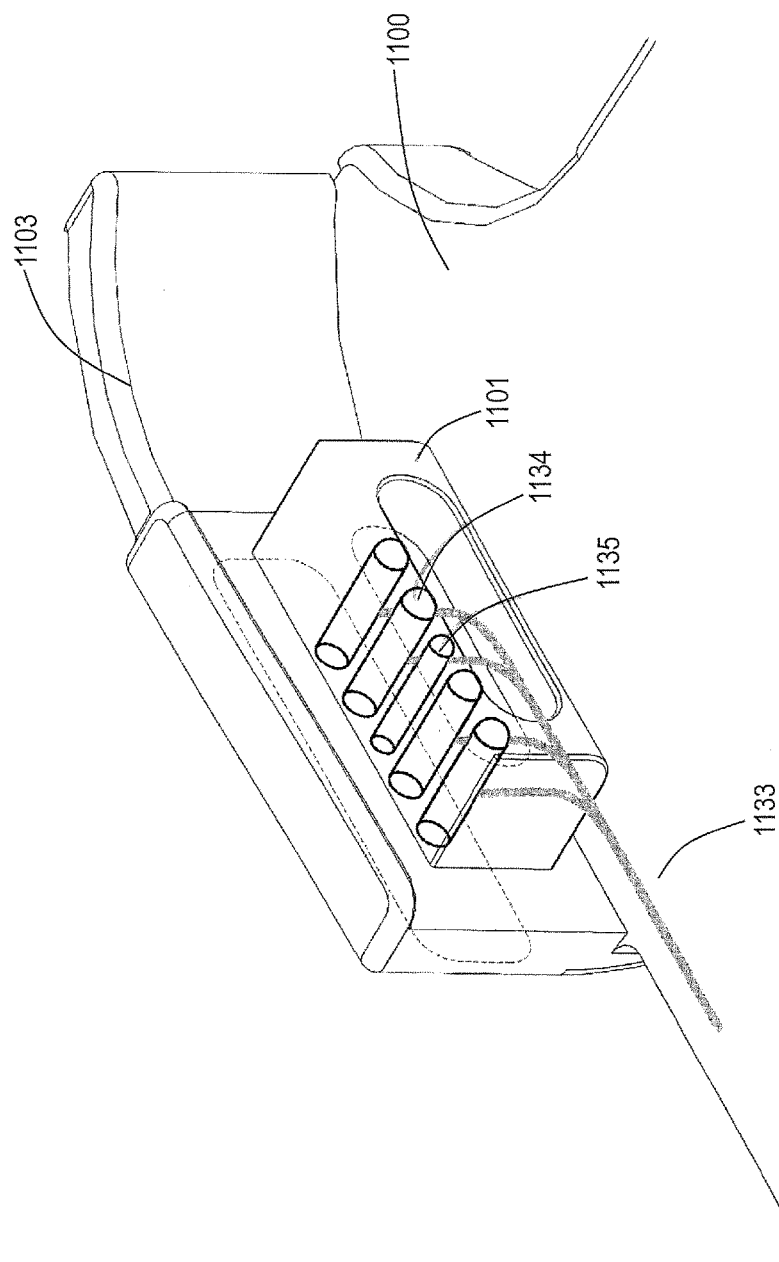
FIG. 41 shows a perspective view of an interposer of the case of FIG. 37A-7B.

FIG. 41 shows a perspective view of the interposer 1101 connected to the case 1100 of FIG. 37A-37B. The interposer 1101 is thinner in this embodiment allowing existing ferromagnetic elements of the connector insert 1130 to be attracted to the connector receptacle 1160 (shown in the view in FIG. 37B) through the interposer 1101. The interposer 1101 comprises a plurality of electrical connections 1134 that couple to the second set of electrical contacts within the magnetic connector receptacle 1160 of the computing device 1150.

In embodiments, the center wire 1135 does not connect to the microprocessor of the battery management system 1111 (shown in the view in FIG. 40B) or the battery pack 1110 (shown in the view in FIG. 40B) within the battery case 1100 while the four exterior wires 1133 connect to the microprocessor of the battery management system 1111 and the battery pack 1110.

Figure 42:
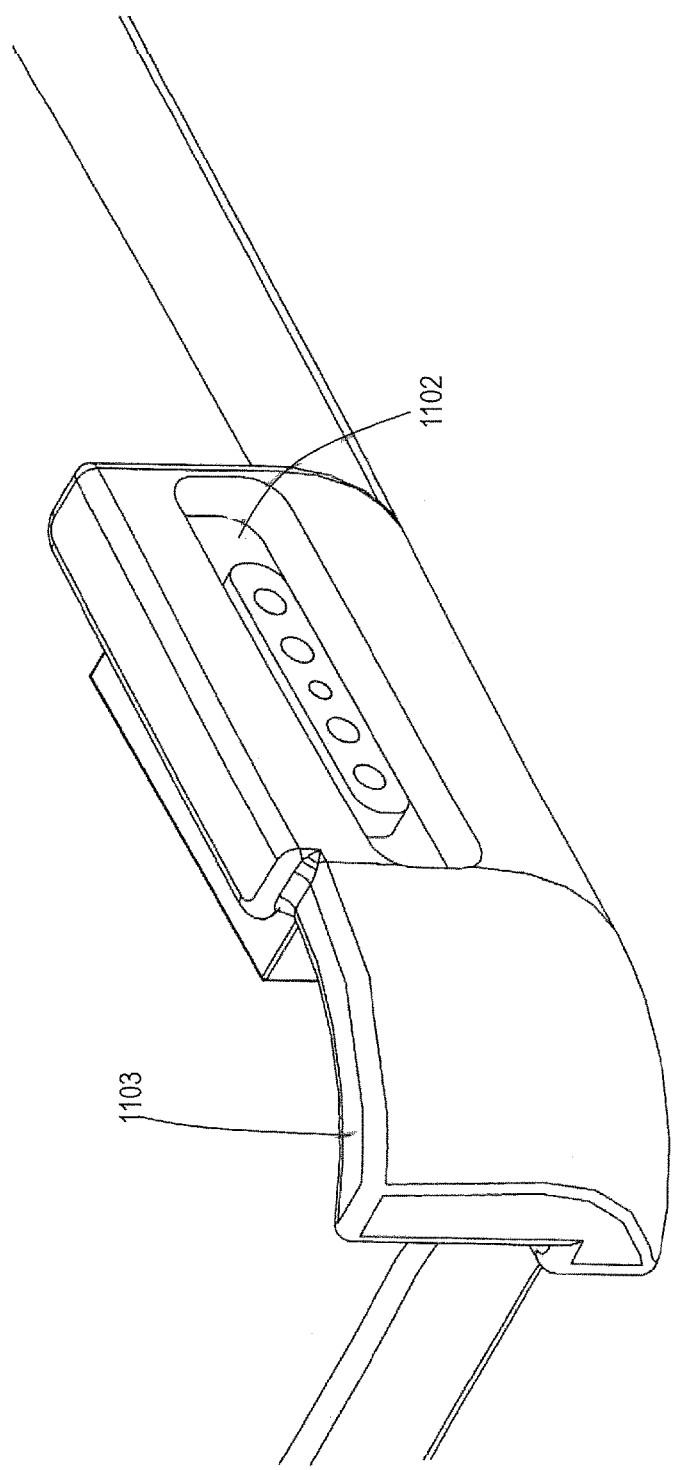
FIG. 42 shows the other perspective view of the interposer of FIG. 41.

FIG. 42 shows another perspective view of the interposer 1101. The receptacle cavity 1102 provides an attachment interface within which the ferromagnetic connector insert 1131 (shown in the view in FIG. 1131) resides, when mated. The interposer 1101 thickness does not prevent magnetic attraction between the ferromagnetic connector 1131 and the magnetic connector receptacle 1160 (shown in the view in FIG. 37B) on the computing device 1150.

Figure 43:
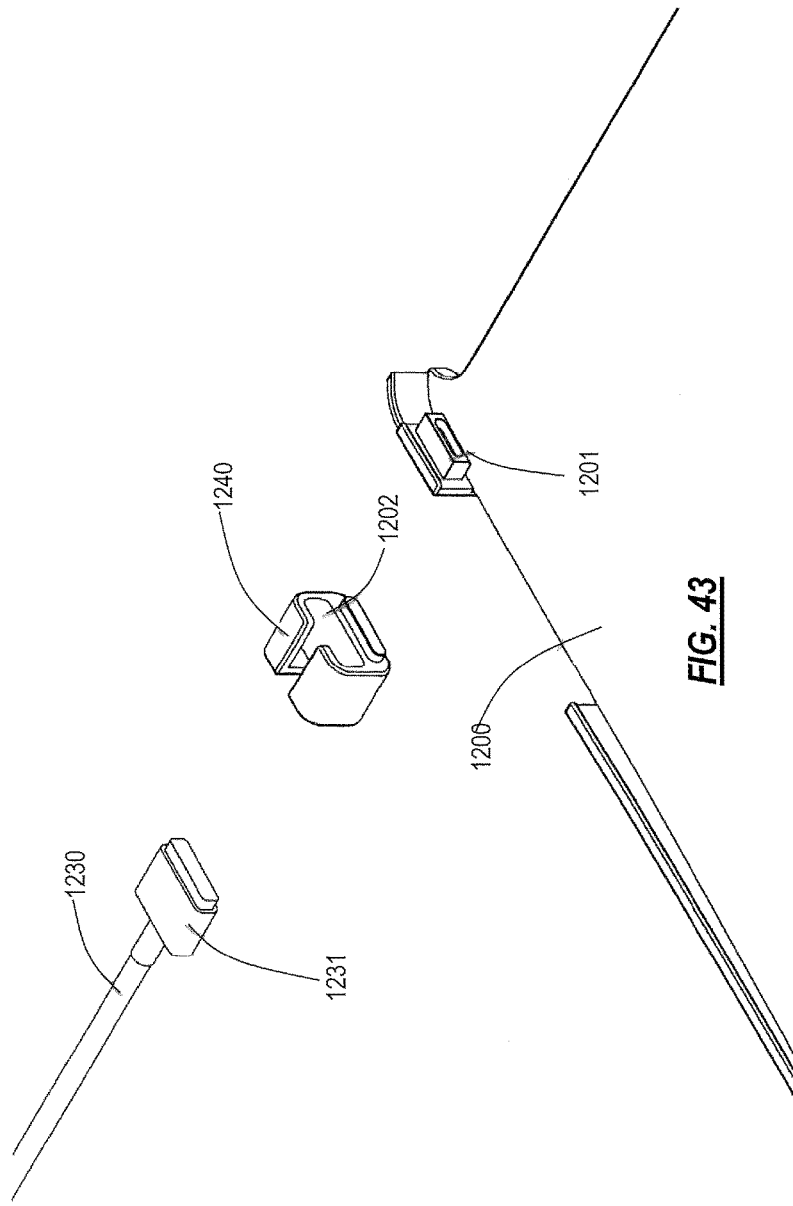
FIG. 43 shows a perspective exploded view of a case for a computing device, according to a twelfth embodiment of the present disclosure, a connector insert and a snap connector to connect therebetween.
Figure 45D:
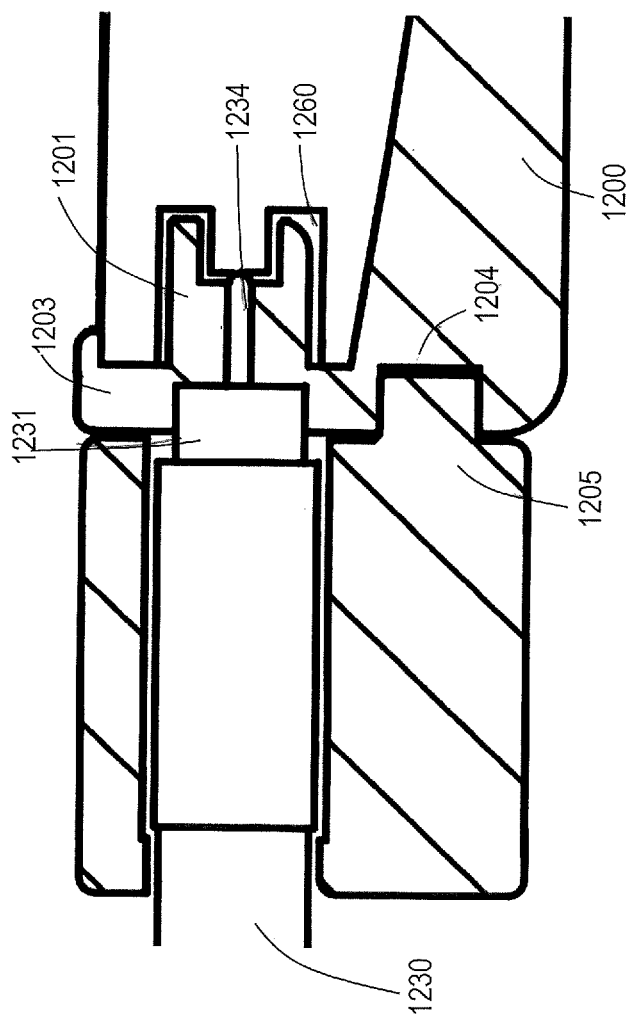

FIG. 43 shows a perspective exploded view depicting another connection method, according to a twelfth embodiment of the present disclosure, for a connector insert 1231 (having a cable 1230 attached to it) to connect to a case 1200 for a computing device 1250. The connector insert 1231 inserts into a cavity 1202 of a snap connector 1240. The snap connector 1240 then connects to the case 1200 via a snap mechanism. In the attached position the connector insert 1231 is mated securely against the interposer 1201. This brings the first set of electrical contacts in the connector insert into direct electrical contact with the set of electrical connections in the interposer and thereby to the set of electrical contacts within the connector receptacle 1260 (shown in the view in FIG. 45B) of the computing device 1250.

Figure 44:
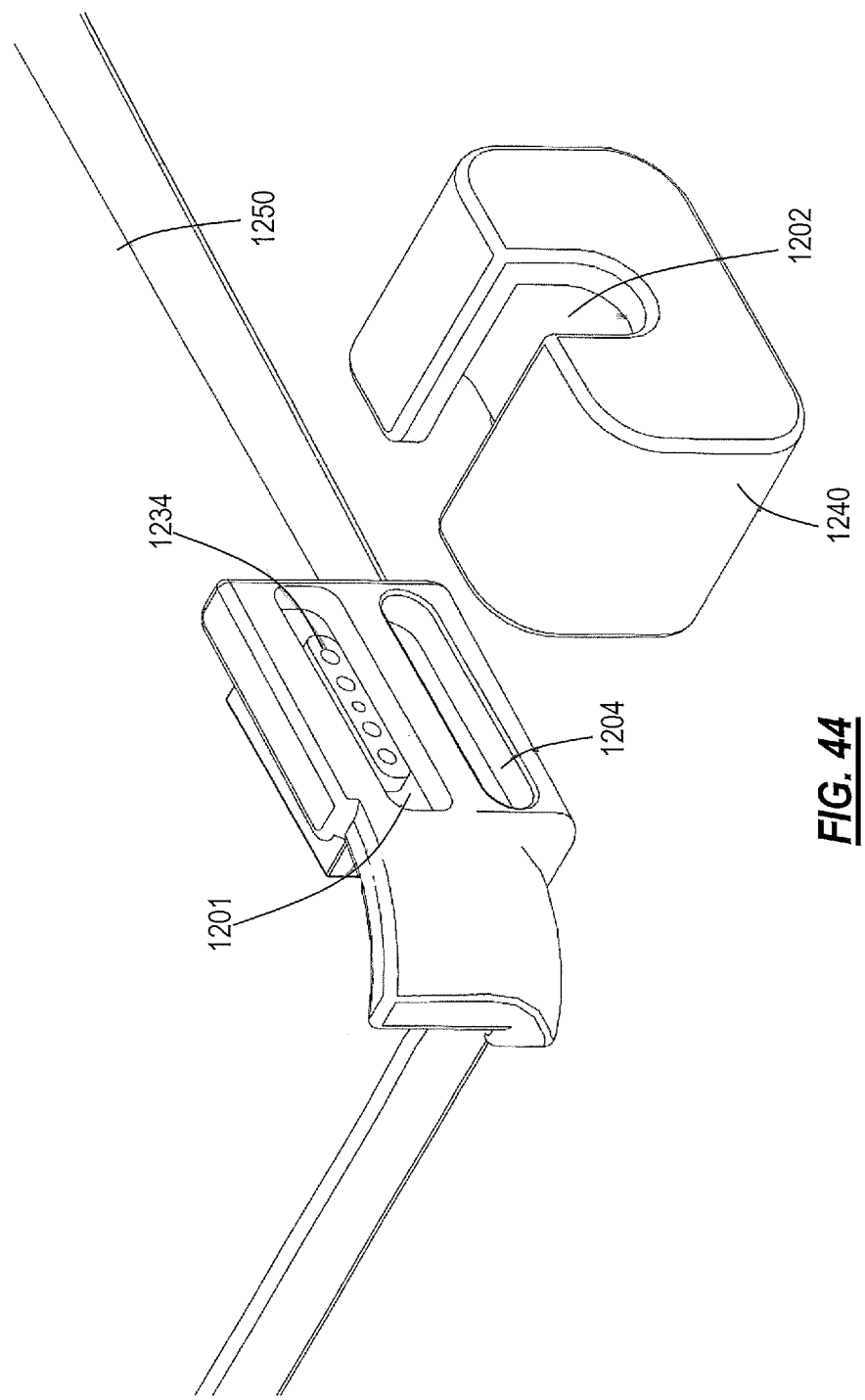
FIG. 44 shows another perspective view of the interposer of the case and the snap connector of FIG. 43.

FIG. 44 shows a perspective view of the interposer 1201 and the snap connector 1240 from the case of FIG. 43. The cavity 1202 inside the snap connector 1240 holds the connector insert 1231 (shown in the view in FIG. 43). The male protrusion 1205 (shown in the view in FIG. 45A) inserts into the female cavity 1204 of the battery case 1200. The interposer 1201 sits adjacent to the female cavity 1204. The second set of electrical contacts 1234 of the interposer 1201 mate with the first set of electrical contacts of the connector insert 1231.

FIG. 45A-45D show front and side cross-sectional views of the connector insert 1231 connecting to the case 1200 by use of the interposer 1201 and the snap connector 1240. The snap connector 1240 houses the connector insert 1231 and securely mates it against the interposer 1201 of the case 1200. The electrical pins 1234 of the interposer 1201 electrically connect the electrical contacts of the connector insert 1231 through to the electrical contacts of the connector receptacle 1260 of the computing device 1250. The male portion 1205 of the snap connector inserts into the female receptacle cavity 1204 of the case 1200. This mating has a snapping action that holds the two components tightly together. This snapping action functions when the female receptacle 1204 has a slightly smaller opening area than the male portion 1205. Through friction the male portion 1205 is held securely in place, fully inserted, into the female receptacle 1204. In embodiments the male portion 1205 can be made of either plastic or rubber. Further, the case 1200 has a clip edge 1203 that fastens the case to the computing device 1250.

The connectors of the present disclosure mechanical couple with a portion of the computing device outside of the connector receptacle housing. In some embodiments, with a surface of the computing device other than the surface via which the connector receptacle is accessed by a user.

While the above-described embodiments of the connectors have been described as being of use for delivery of electrical power to computing devices, they may also be used with other electronic devices.

Electrical contacts described in the various embodiments of the present disclosure might be spring loaded or fixed type. Use of spring-loaded contacts allows the pins to self-align in case of variations in the size or position of the pins. This is important in case of connectors with number of pins greater than two.

In embodiments, the connector insert housing solutions of the present disclosure may also be adapted for use with magnetic connector inserts so as to enable the latter for use with computing devices that have non-magnetic connector receptacles. For example, the Magsafe and Magsafe 2 connectors from Apple, both of which contain a ferromagnetic attraction plate, could be mated to non-magnetic connector receptacles if they are used in conjunction with the connector insert housing embodiments of the present disclosure.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A connector operable with a computing device, the connector comprising:
    a connector insert comprising a first plurality of electrical contacts configured to electrically couple with a second plurality of electrical contacts in the computing device via an opening through a side surface of the computing device, when the connector is mated with the computing device; and
    a non-magnetic connector insert housing having a cavity within which the connector insert is housed, the non-magnetic connector insert housing being configured to mechanically couple with the computing device at a top surface of the computing device, when the connector is mated with the computing device.

2. The connector of claim 1, wherein the connector insert comprises a cable end configured to deliver received electrical power to the first plurality of electrical contacts.

3. The connector of claim 1, wherein the non-magnetic connector insert housing comprises an end portion configured to rest in a space between a display screen and a keyboard of the computing device, when the connector is mated with the computing device.

4. The connector of claim 1, wherein dimensions of the non-magnetic connector insert housing are based on dimensions of the computing device.

5. The connector of claim 1, wherein the non-magnetic connector insert housing comprises a protective strip along its edge to protect the computing device from damage resulting from incidental contact with the non-magnetic connector insert housing.

6. The connector of claim 1, wherein the non-magnetic connector insert housing comprises a finger indent affordance that indicates where force may be applied to dislodge the non-magnetic connector insert housing, when the connector is mated with the computing device.

7. The connector of claim 1, wherein the connector comprises a cable holder receptacle configured to retain a cable.

8. The connector of claim 1, wherein the connector insert is separable from the non-magnetic connector insert housing.

9. The connector of claim 8, wherein the connector insert comprises a spring mechanism that cooperates with the non-magnetic connector insert housing to enhance the electrical coupling between the first plurality of electrical contacts and the second plurality of electrical contacts, and to enhance contact between the non-magnetic connector insert housing and the side and top surfaces of the computing device, when the connector is mated with the computing device.

10. The connector of claim 8, wherein the non-magnetic connector insert housing comprises a locking channel configured to cooperate with a tab on the connector insert to substantially prevent separation of the connector insert when inserted into the non-magnetic connector insert housing.

11. The connector of claim 1, wherein the non-magnetic connector insert housing comprises a clip and an elastic section coupled between the clip and the connector insert, and wherein the clip attaches to a surface opposite to the side surface of the computing device and the elastic section pulls the connector insert towards the connector receptacle, when the connector is mated with the computing device.

12. The connector of claim 1, wherein the non-magnetic connector insert housing is further configured to contact both the side surface and the top surface of the computing device when the connector is mated with the computing device.

* * * * *